Aug. 18, 1953     D. H. RANSOM ET AL     2,649,505
PULSE TIME POSITION SWITCHING SYSTEM
Filed Dec. 30, 1947     25 Sheets-Sheet 8

Aug. 18, 1953     D. H. RANSOM ET AL     2,649,505
PULSE TIME POSITION SWITCHING SYSTEM
Filed Dec. 30, 1947     25 Sheets-Sheet 14
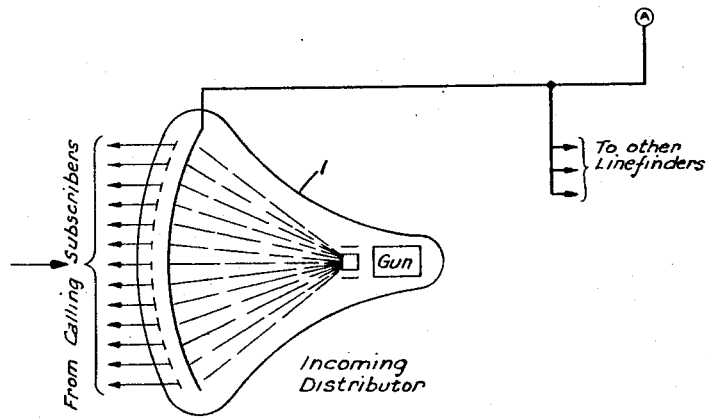
FIG.14.
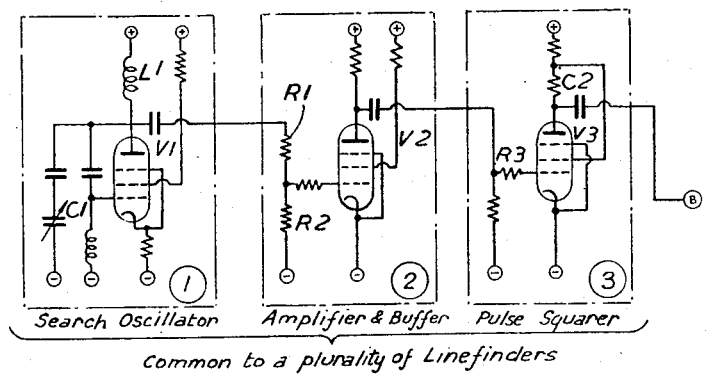

FIG. 16.

Aug. 18, 1953
D. H. RANSOM ET AL
2,649,505
PULSE TIME POSITION SWITCHING SYSTEM
Filed Dec. 30, 1947
25 Sheets-Sheet 18
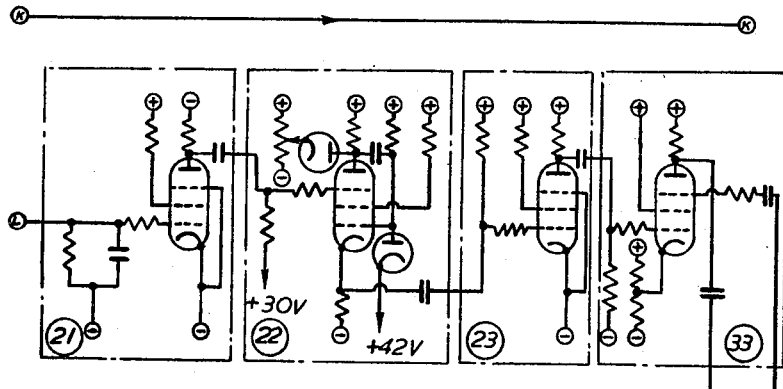
FIG.18.
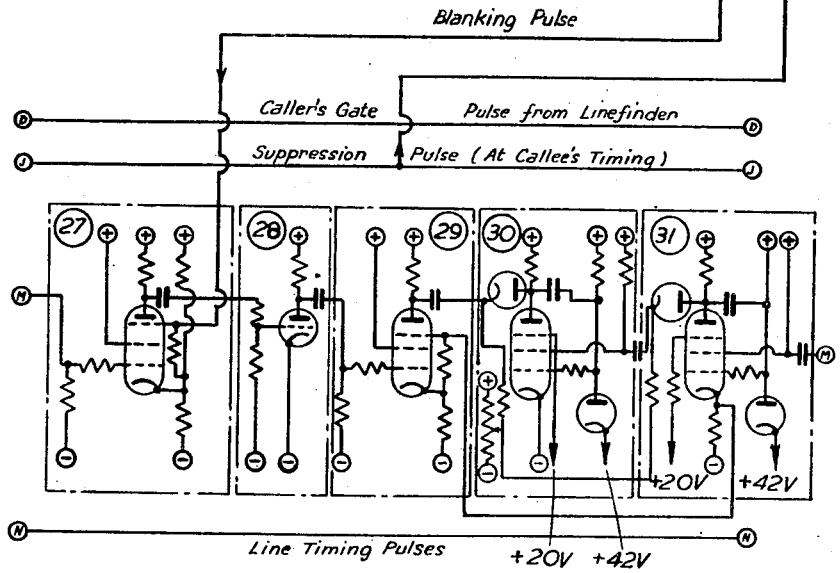
Inventor
David Hiram Ransom
William Leslie Roberts
Ronald Harold Taplin
By
Robert Harding Jr.
Attorney Aug. 18, 1953    D. H. RANSOM ET AL    2,649,505
PULSE TIME POSITION SWITCHING SYSTEM
Filed Dec. 30, 1947    25 Sheets-Sheet 23

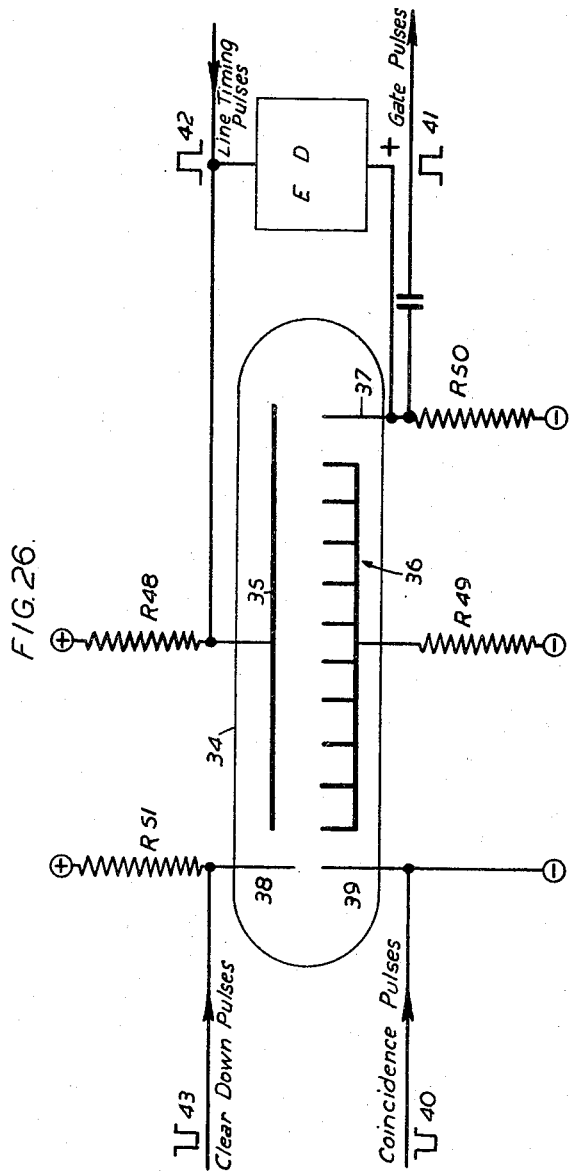

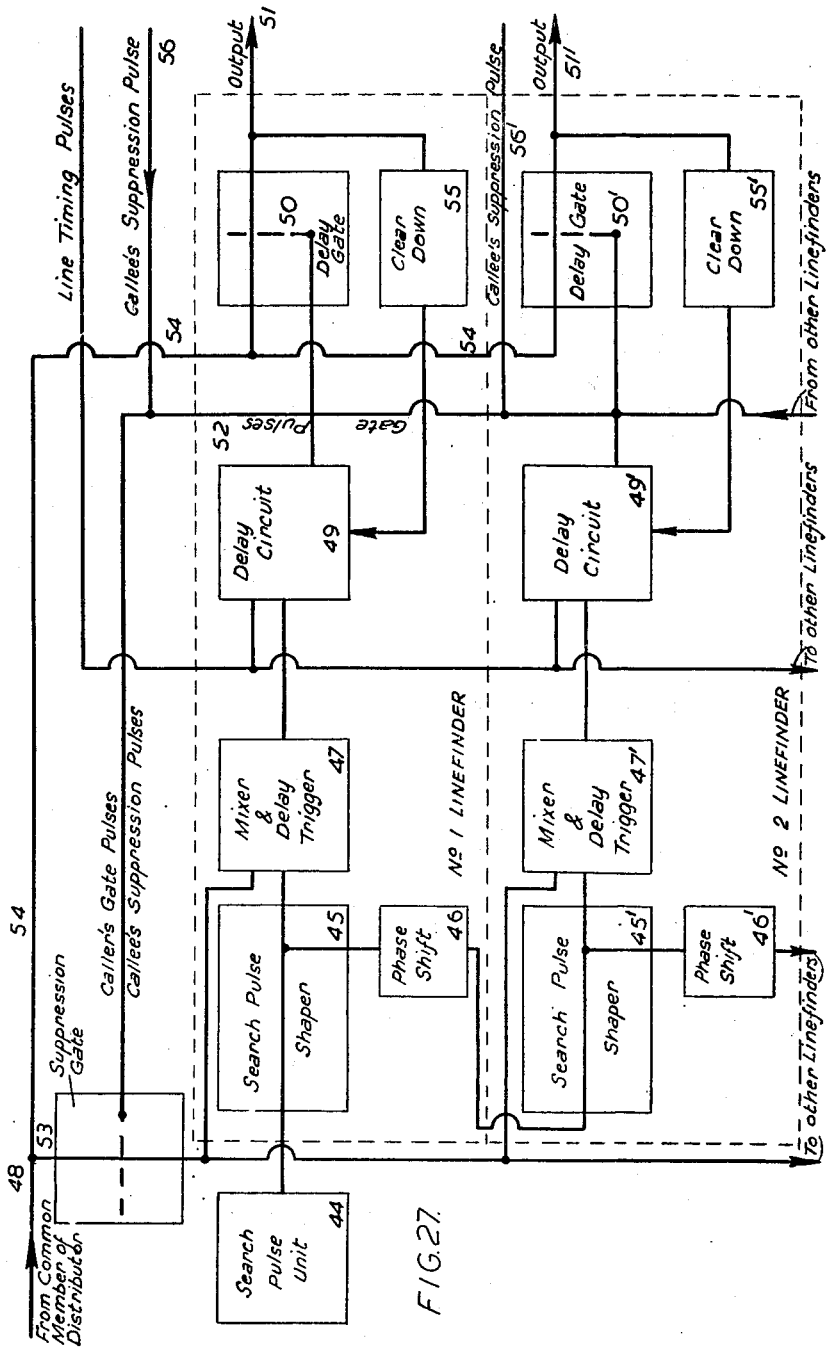

UNITED STATES PATENT OFFICE 2,649,505

PULSE TIME POSITION SWITCHING SYSTEM

David Hiram Ransom, William Leslie Roberts, and Ronald Harold Taplin, London, England, assignors to International Standard Electric Corporation, New York, N. Y.

Application December 30, 1947, Serial No. 794,724
In Great Britain October 4, 1946

Section 1, Public Law 690, August 8, 1946
Patent expires October 4, 1966

11 Claims. (Cl. 179—15)

This invention relates to interconnected and switching systems of the type where communication is established by pulses of electrical energy.

It has previously been proposed to provide for automatic interconnection between a number of transmission paths and a lesser number of channels for the transmission of pulses of electrical energy with means for connecting individual transmission paths to transmission channels but in the previous proposal the precaution against a single transmission path being connected concurrently with more than one transmission channel, have been of a nature such as to render such concurrent connections exceedingly improbable and not to exclude the possibility by positive means.

According to one of its features, the invention consists of automatic means for interconnecting a number of transmission paths and a lesser number of channels for the transmission of pulses of electrical energy comprising means for connecting individual transmission paths to transmission channels and positive means ensuring that not more than one transmission channel can be concurrently connected to a given transmission path.

According to another of its features, the invention consists of a switching system in which a number of inputs are individually allotted time positions in a recurring cycle of time positions and in which, in response to a signal applied to an input a pulse may be produced or one or more characteristics of a pulse altered, at the time position allotted to the input to which the signal is applied, such pulse being applied to a plurality of segregating devices each adapted to respond to a pulse produced or altered as aforesaid and subsequently to segregate pulses at that time position from pulses at other time positions and in which positive provision is made for ensuring that two or more of the segregating means cannot respond to the same produced or altered pulse.

According to yet another of its features, the invention consists of a switching system having a pluraliy of inputs, means for allotting to such inputs individual time positions in a recurring cycle of time positions, means for producing a pulse or altering one or more characteristics of a pulse in response to a signal applied to an input, at the time position allotted to such input, means for generating search pulses at a frequency different from the recurrence frequency of the said cycle, a plurality of segregating means, and means for applying the search pulses thereto, each segregating means being adapted to compare the timing of the pulses produced or altered as aforesaid with the said search pulse and, on the coincidence in the segregating means of a pulse produced or altered as aforesaid, with a search pulse, to segregate further pulses at the same time position as the coincident pulse, from pulses at other time positions, and means for ensuring that such a coincidence cannot be effective in any two or more of the segregating means simultaneously in respect of the same pulse.

Certain embodiments of the invention have been developed primarily for use in an automatic telephone system and these embodiments will be described with reference to the accompanying drawings in which:

Figs. 1 to 25, inclusive, represent one embodiment of the invention and Figs. 26 and 27 another embodiment of the invention.

Referring to the figures individually:

These three figures are drawn so as to illustrate the general principles of this embodiment of the invention and the blocks represent rather the functions which are performed to achieve the required ends than the units of equipment actually used in the embodiment.

Figure 4:
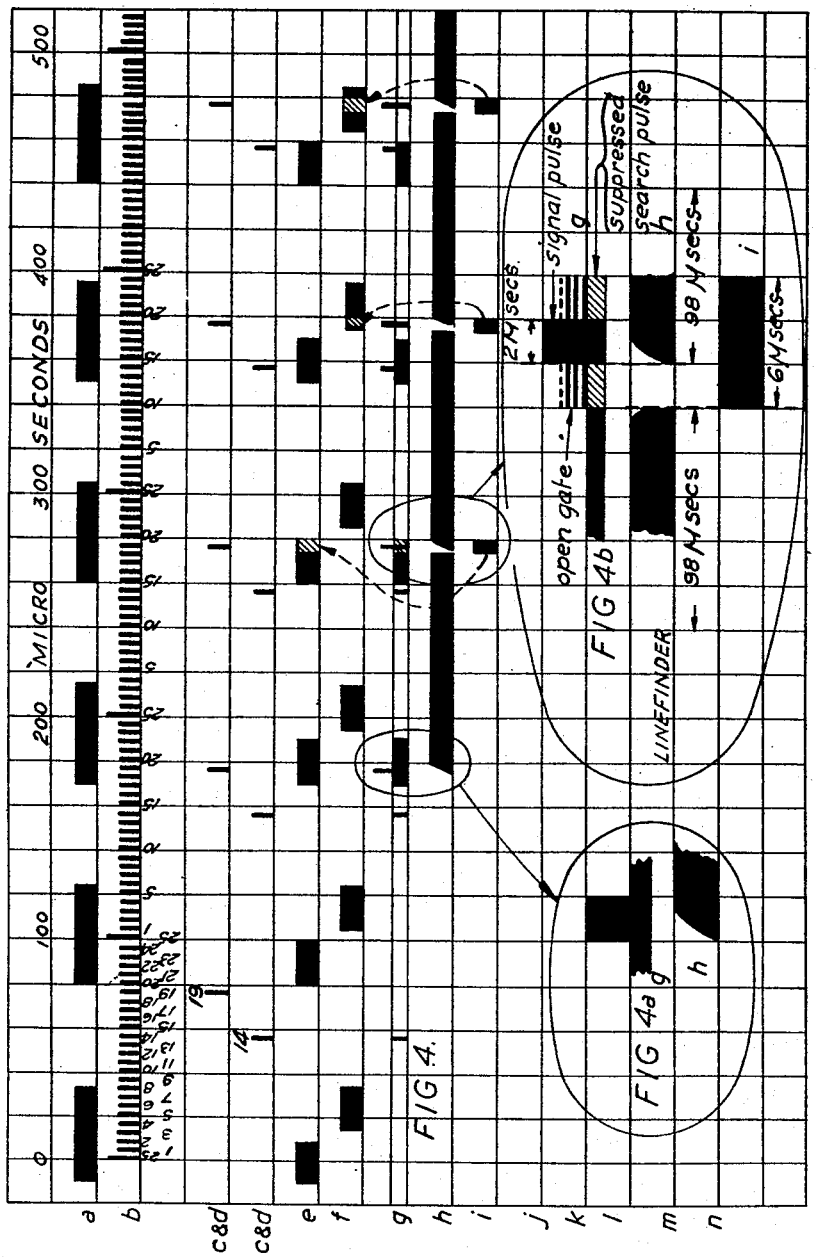
Figure 5:
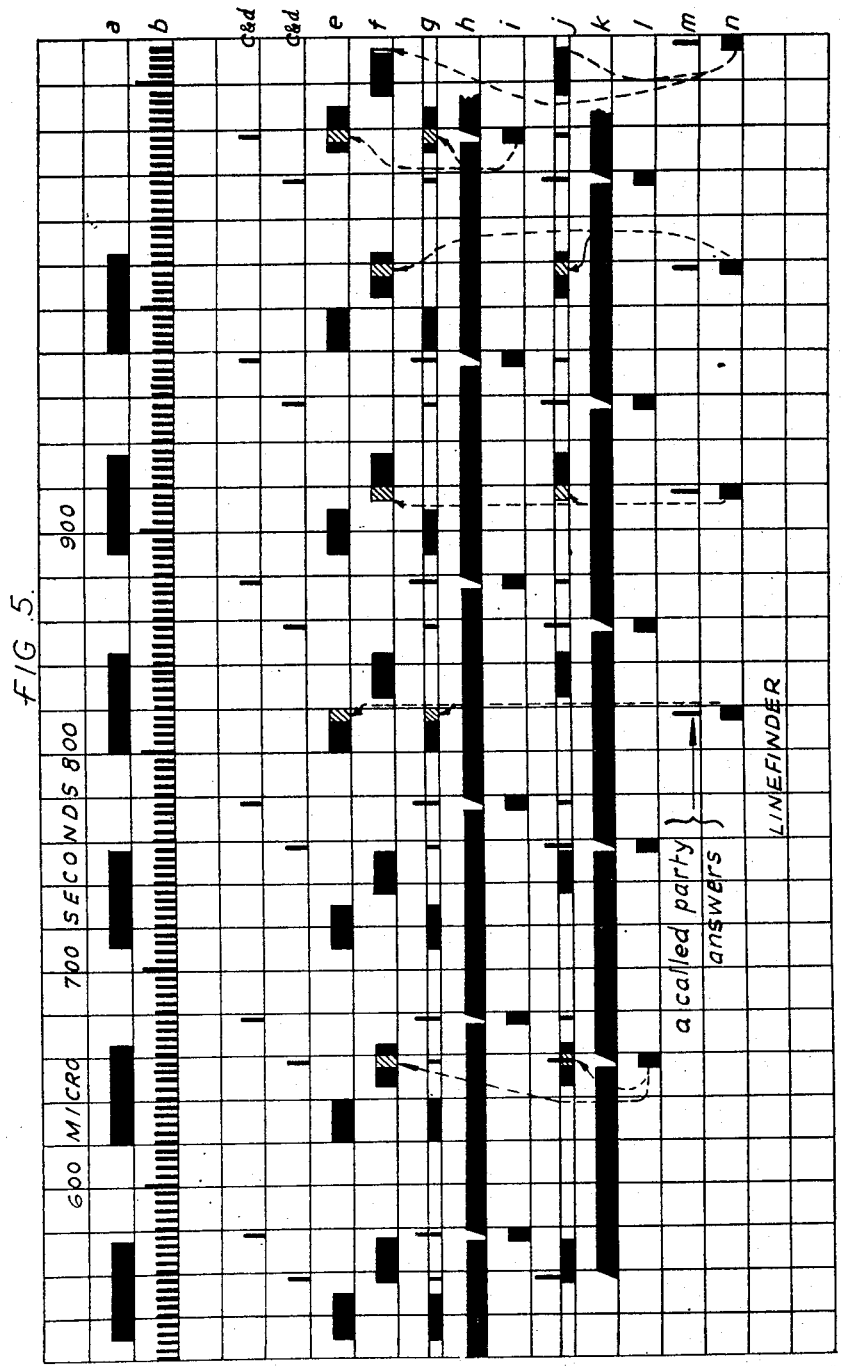

Figs. 4 and 5 which should be read together as one figure (Fig. 4 on the left and Fig. 5 on the right), are time charts showing the sequence of events in two linefinders in which caller No. 19 and caller No. 14 initiate calls and a called party (No. 4 chosen for illustration) answers. The various horizontal lines which are indicated by letters in the margin indicate the conditions at points in Fig. 1 bearing corresponding letter references.

Figs. 4a and 4b are enlarged insets showing portions of Fig. 4 in more detail.

Figure 6:
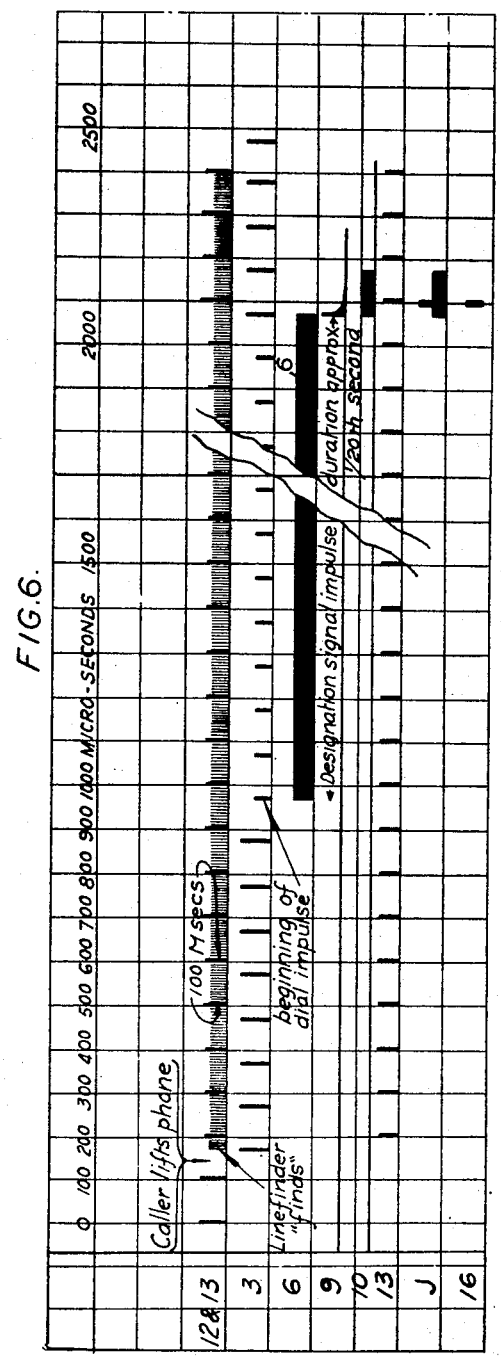

Fig. 6 is a time chart showing the sequence of events up to and during the passing of the first impulse of a designation signal, the scale along the horizontal axis being considerably reduced by comparison with Figs. 4 and 5 to enable a longer period of time to be covered.

Figure 7:
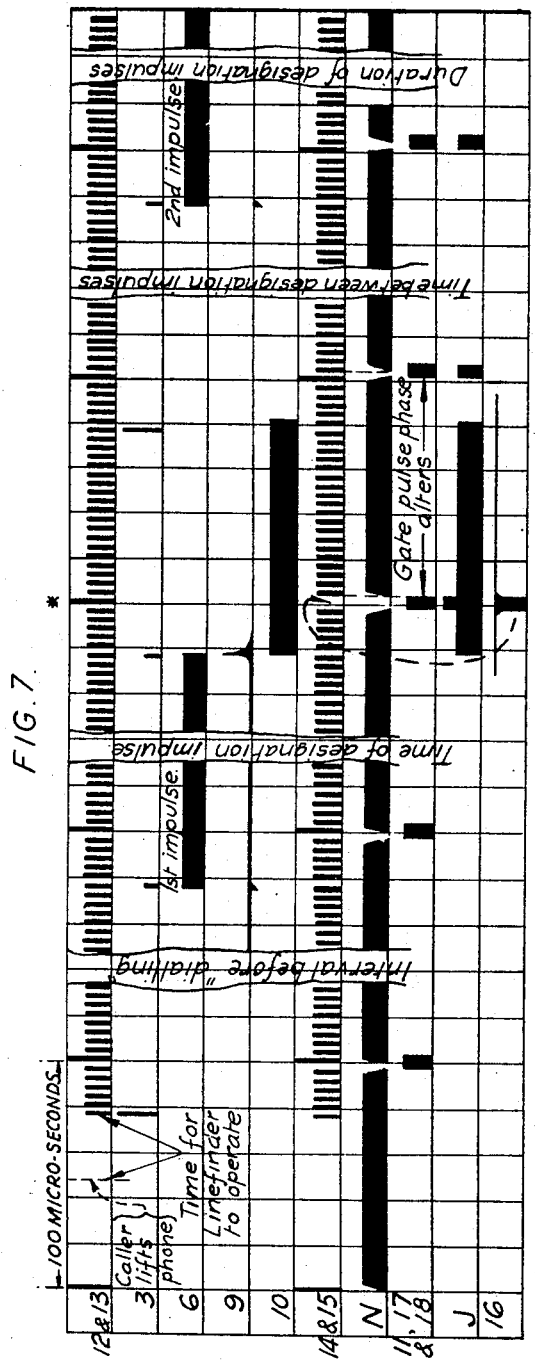
Figure 8:
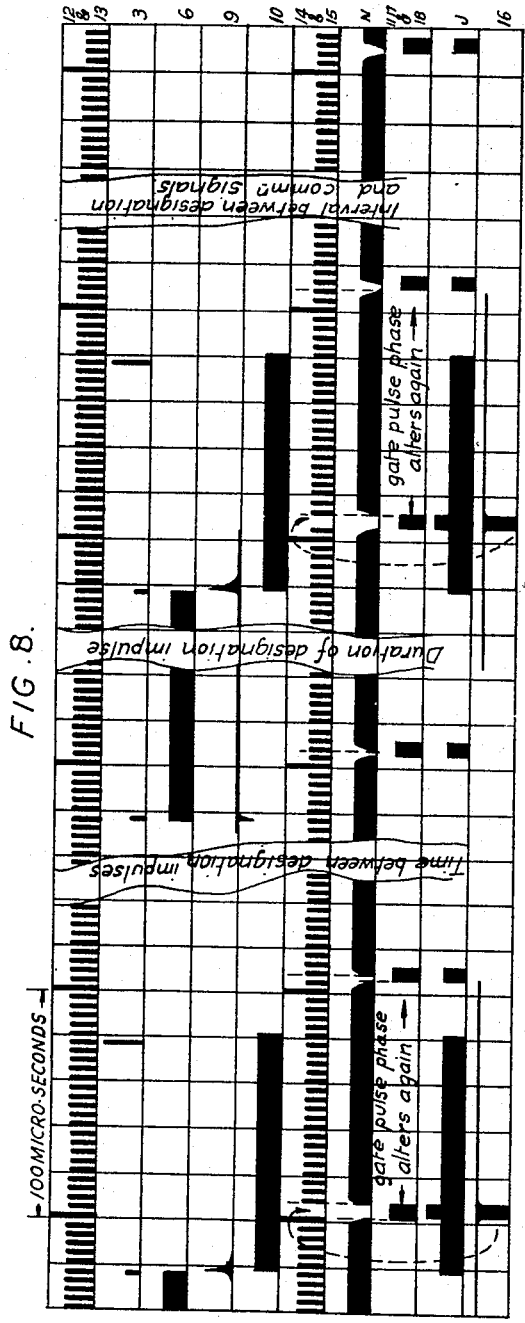

Figs. 7 and 8 which should be read together as one figure (Fig. 7 on the left and Fig. 8 on the right), are time charts showing the sequence of events during the passage of designation signals and the consequent setting up of a connection. The scale along the horizontal axis is the same as in Figs. 4 and 5.

Figure 9:
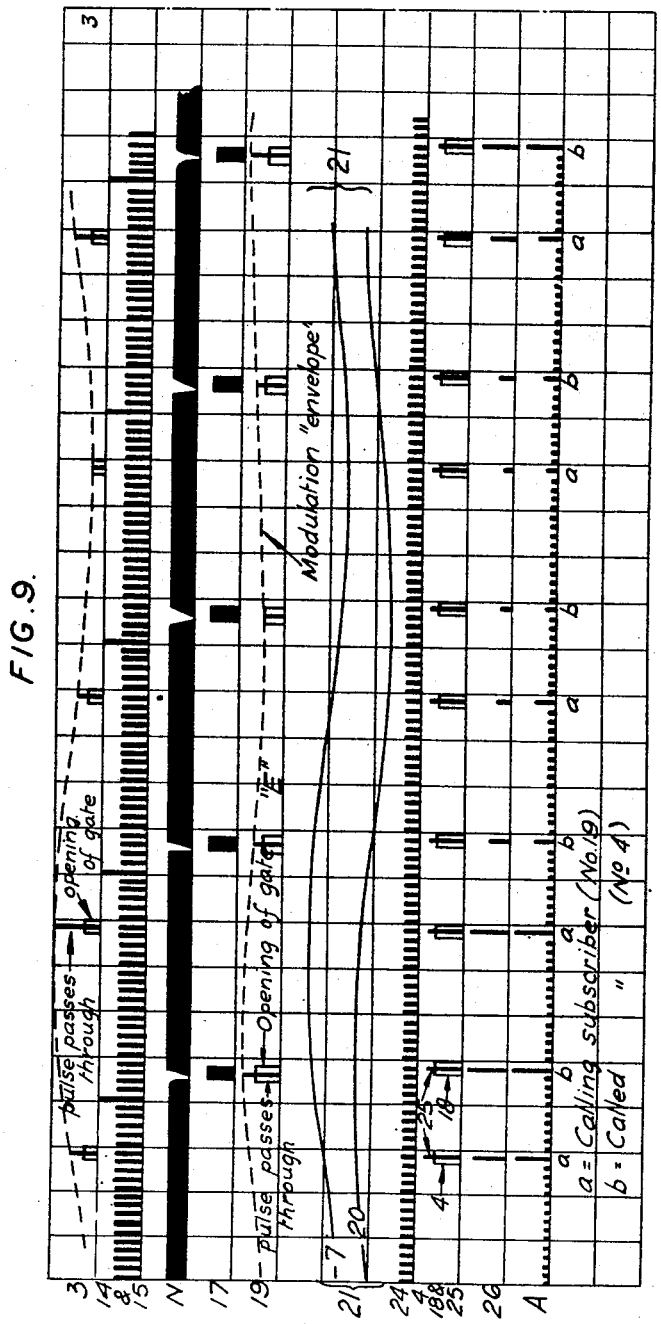

Fig. 9 is a time chart showing the sequence of events following these depicted in Fig. 8 and may be placed at the right thereof to appreciate how the one sequence of events succeeds the other, but can also be read as a separate figure. This figure shows the passage of the communication signals of a caller and a called subscriber through the equipment and their delivery to the common member of a distributor.

Figure 2:
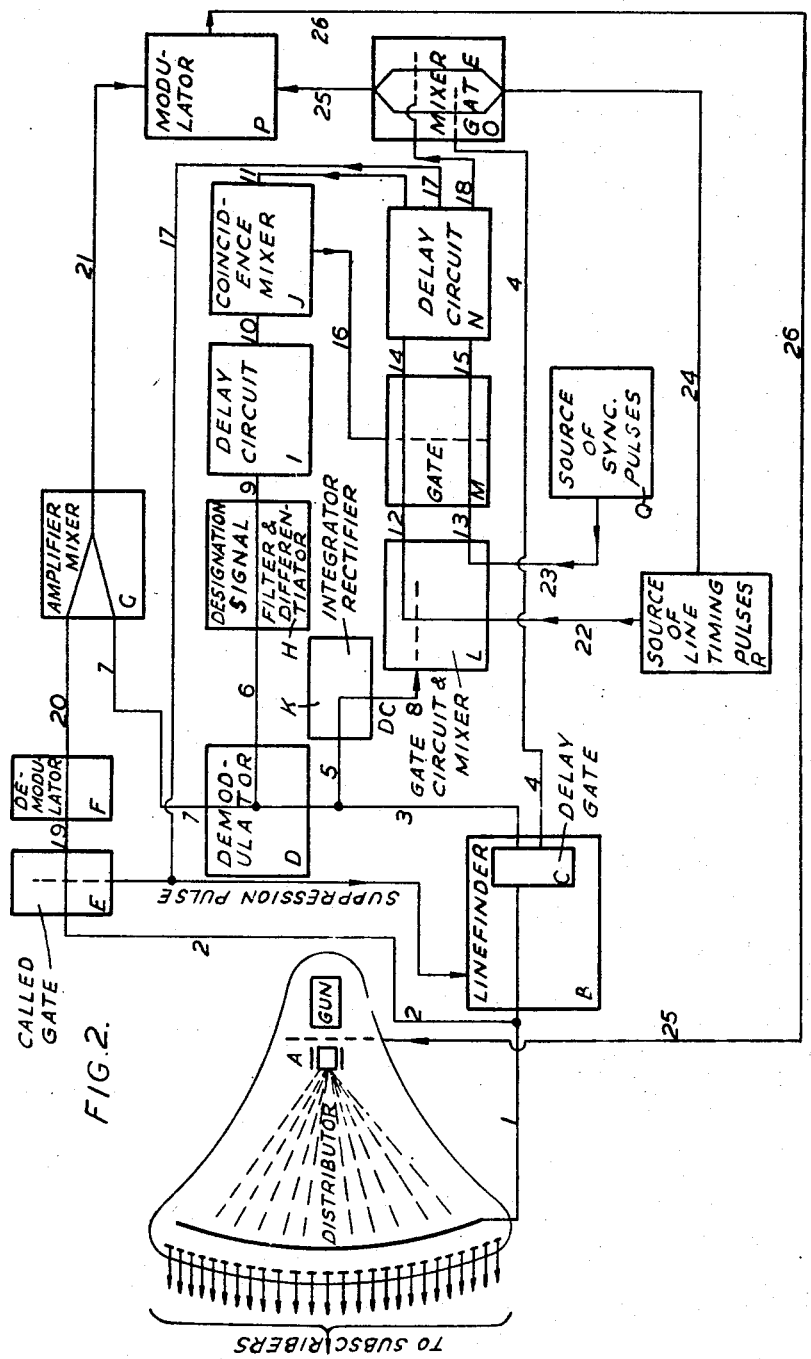
Fig. 2 is a block schematic diagram of a line selector, individually associated with a linefinder.

In Figures 6, 7, 8, and 9, the various horizontal lines which are indicated by numbers and letters in the margins, depict, in the case of numbers, the signals passed along connections similarly numbered in Fig. 2, and, in the case of letters, the conditions obtaining in the circuit elements indicated by corresponding letters in Fig. 2.

Figure 23:
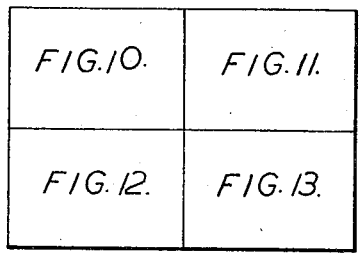

Figs. 10, 11, 12 and 13, which should be placed together as indicated in Fig. 23 and read as one drawing, are schematic diagrams of two linefinders and two communication channels, in a practical version of the embodiment described.

Figure 10:
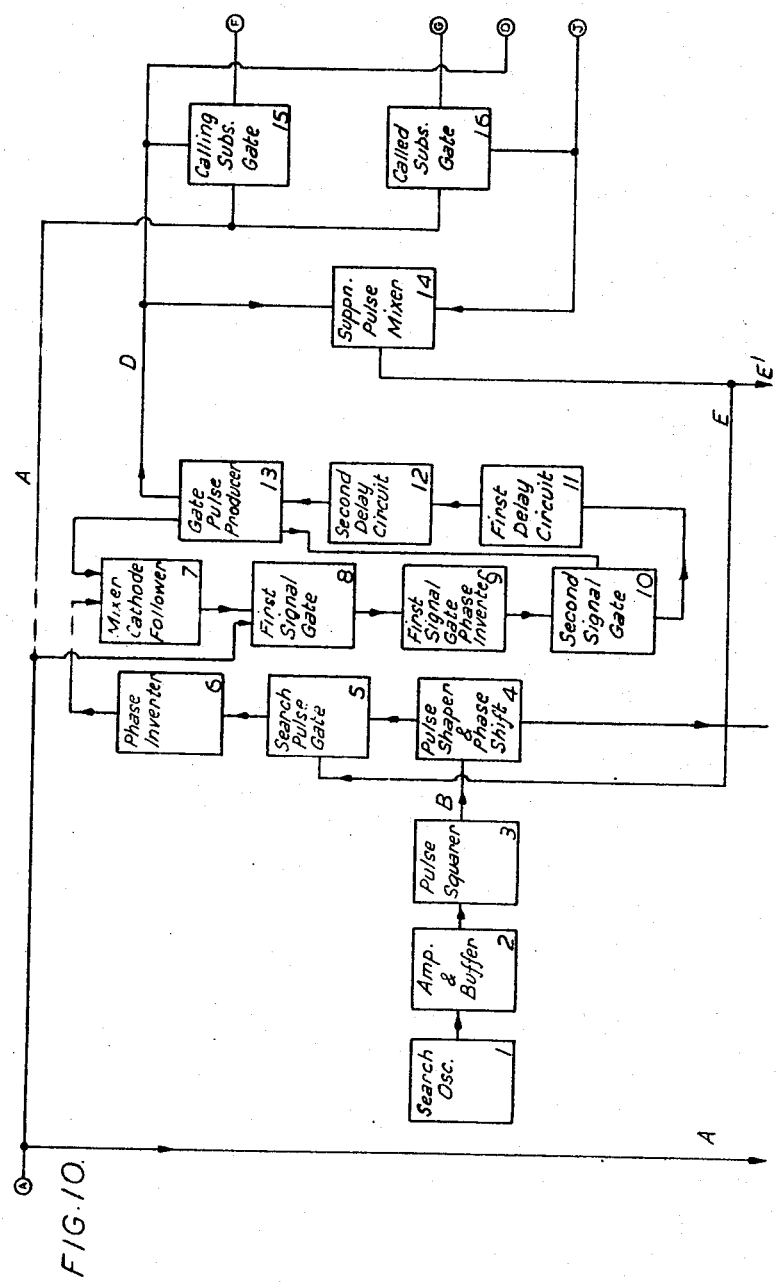
Figure 12:
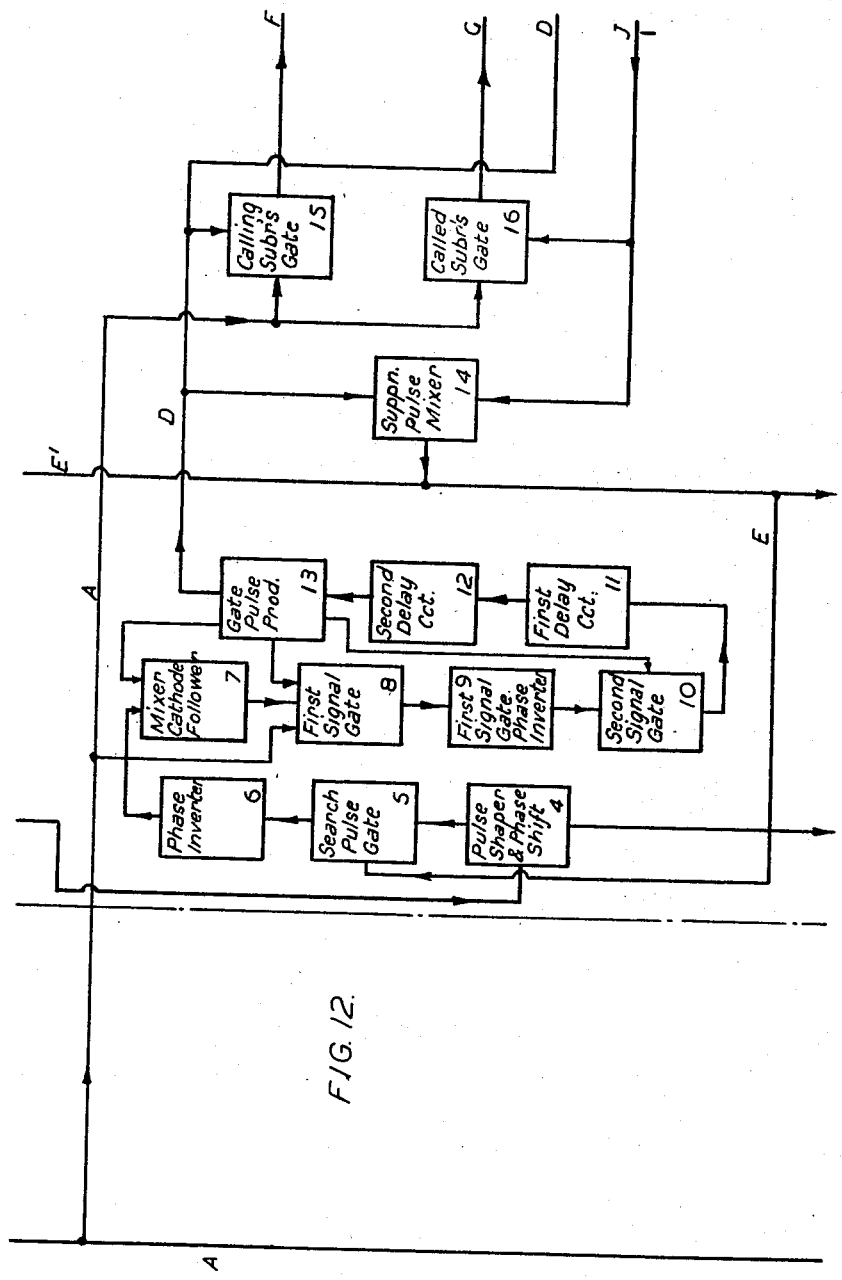
Figure 15:
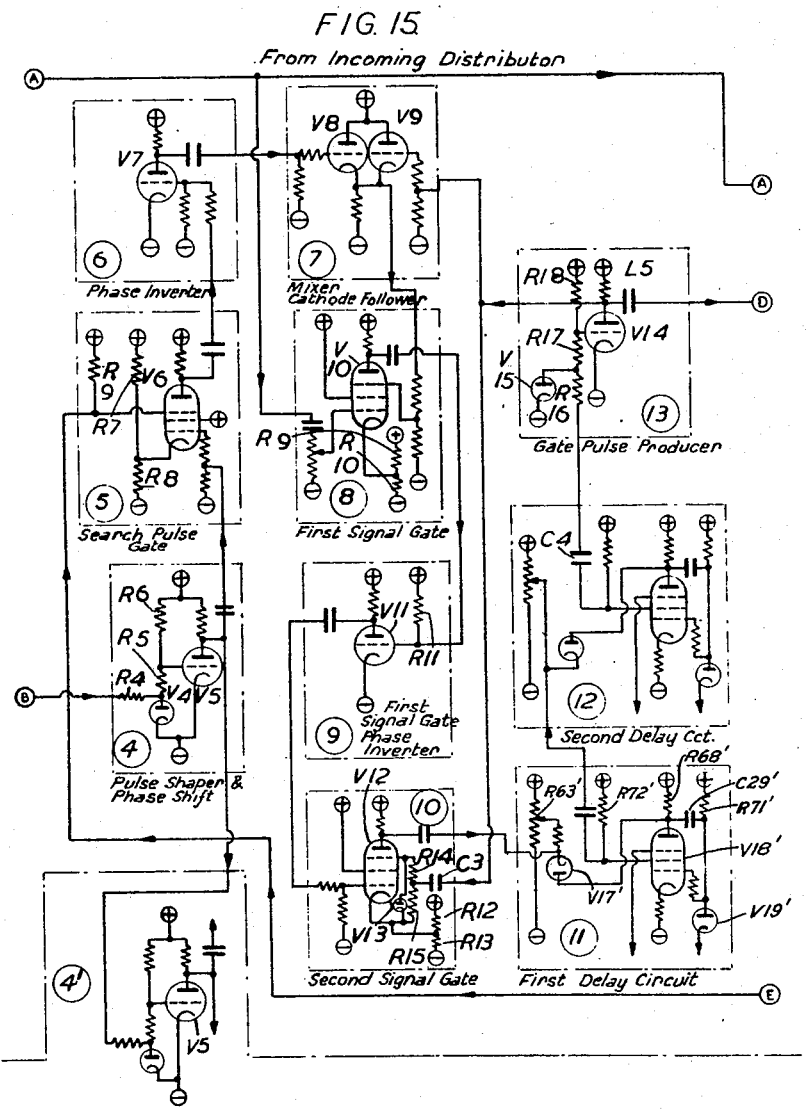
Figure 16:
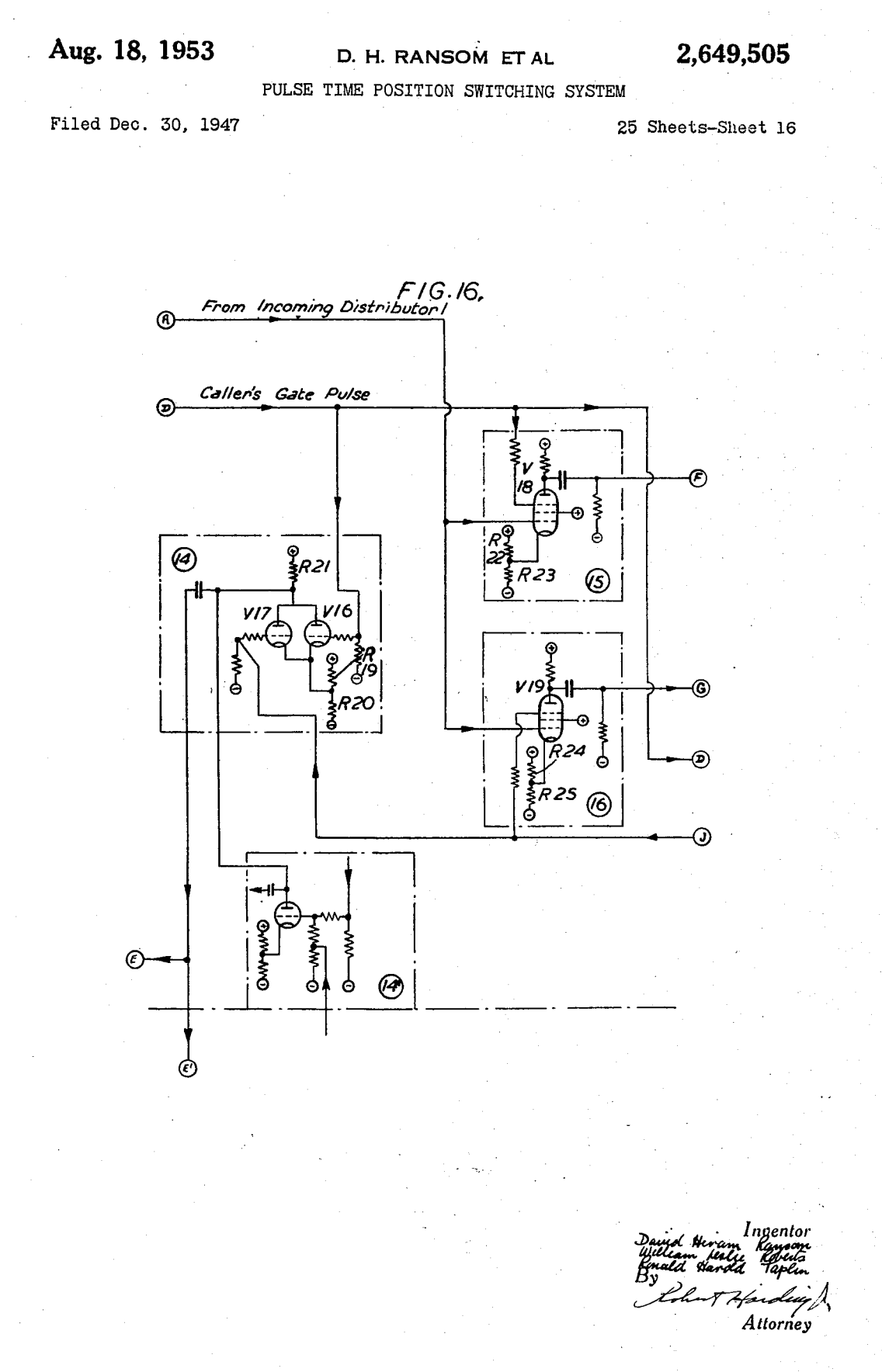

Figs. 14, 15, and 16 show the detailed circuits of the blocks of Figs. 10 and 12.

Figure 11:
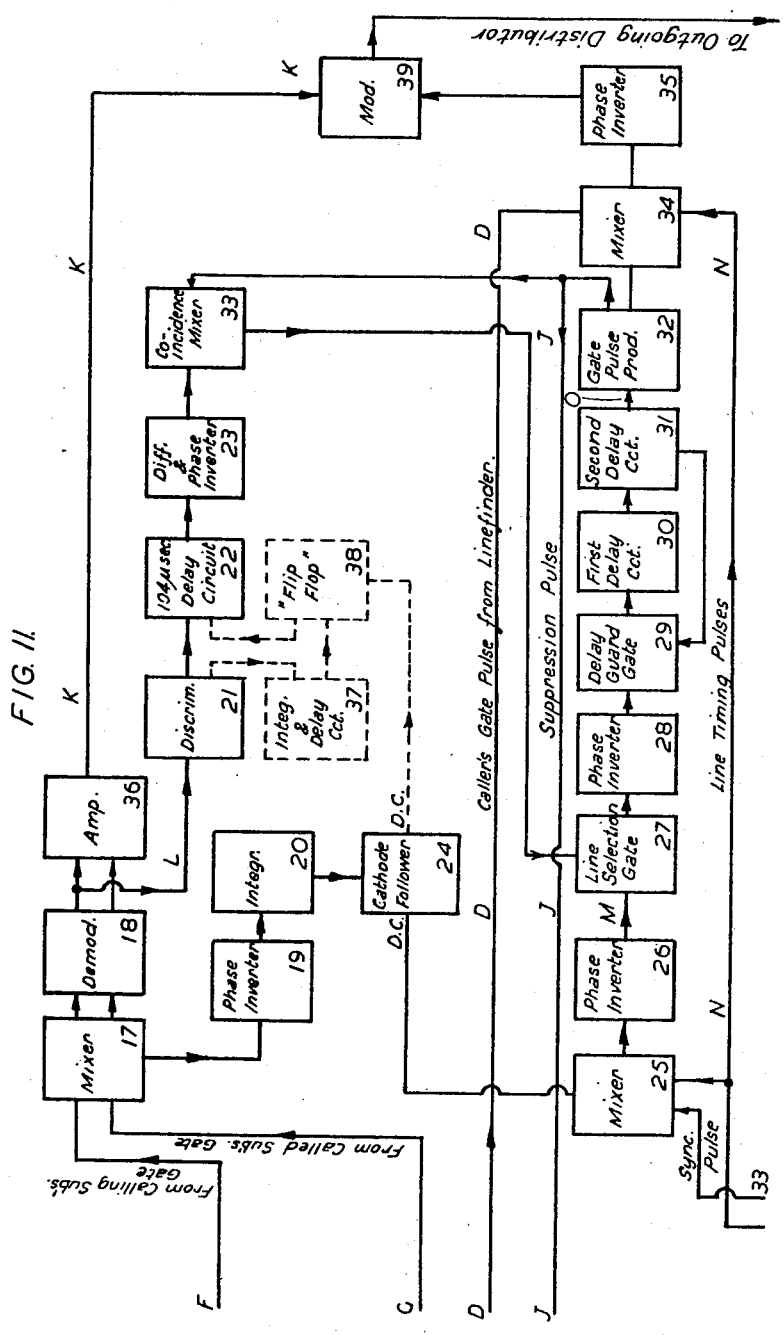
Figure 13:
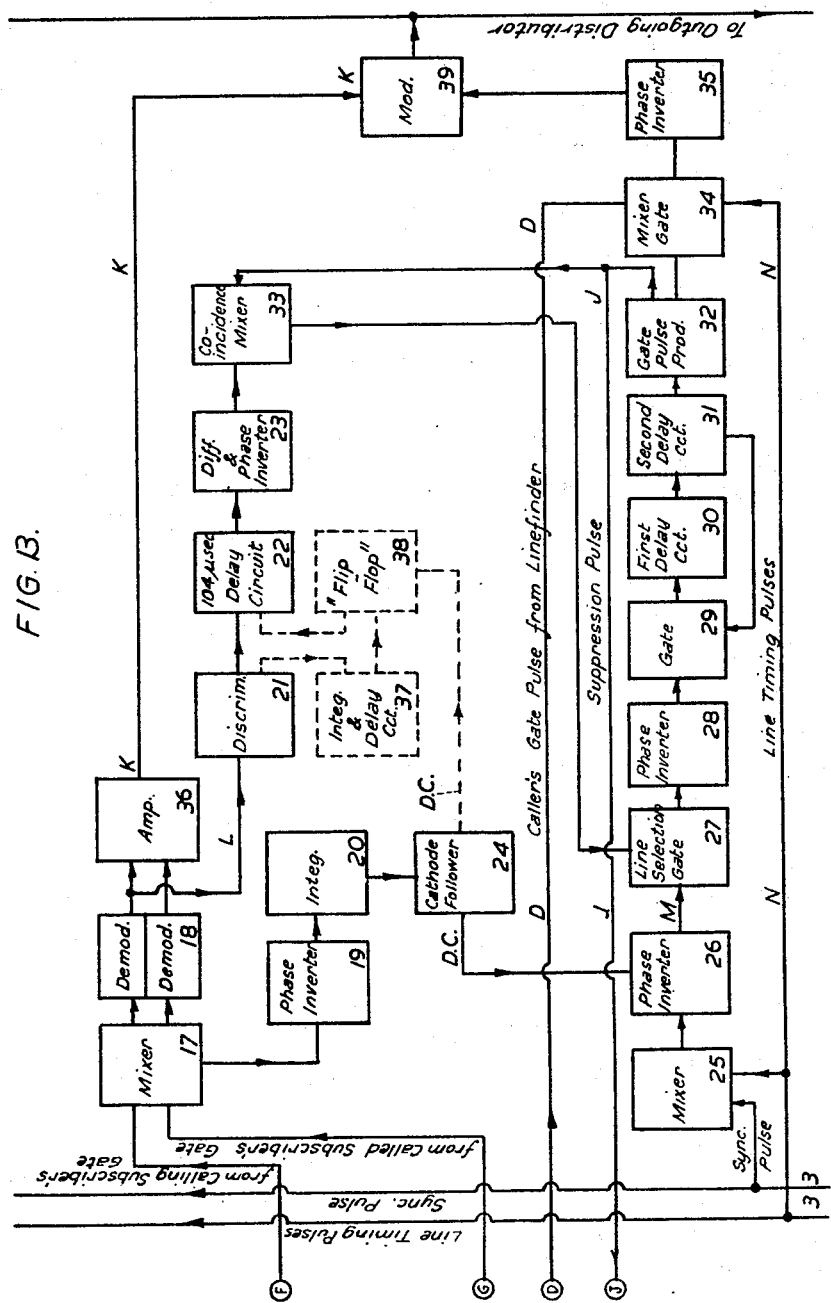
Figure 17:
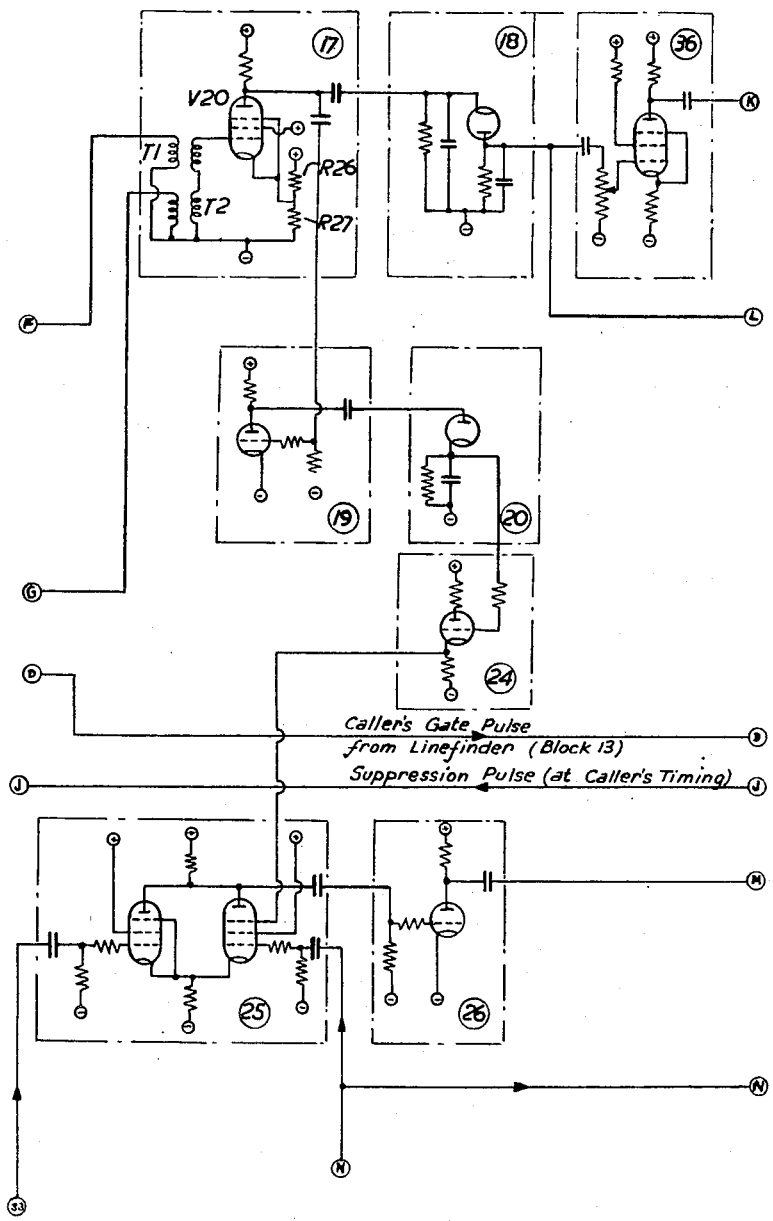
Figure 19:
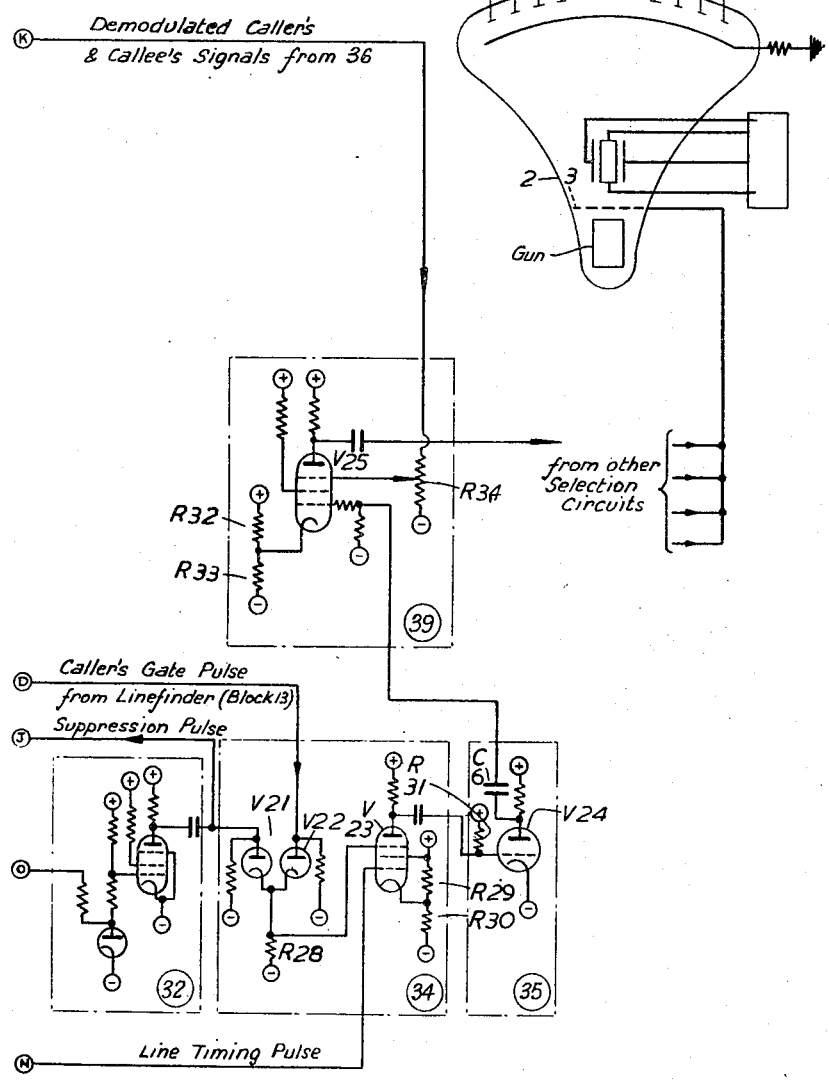

Figs. 17, 18 and 19 show the detailed circuits of the blocks of Figs. 11 and 13.

Figure 24:
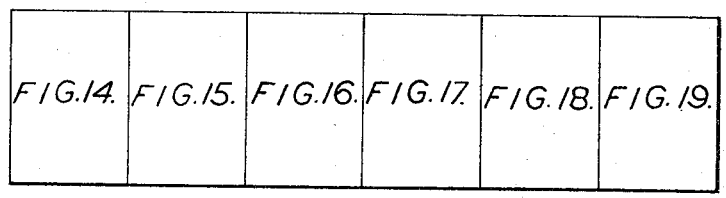

Figs. 14 to 19 inclusive should be placed together as indicated in Fig. 24 and read as one drawing.

In Figs. 14 to 19 inclusive, certain connections passing from one figure to another are shown connected to terminals and corresponding terminals on adjacent figures, when arranged as indicated in Fig. 24, should be considered as connected together.

This is done merely for convenience of interrelating the figures, and does not indicate the actual construction of the embodiment.

Figure 20:
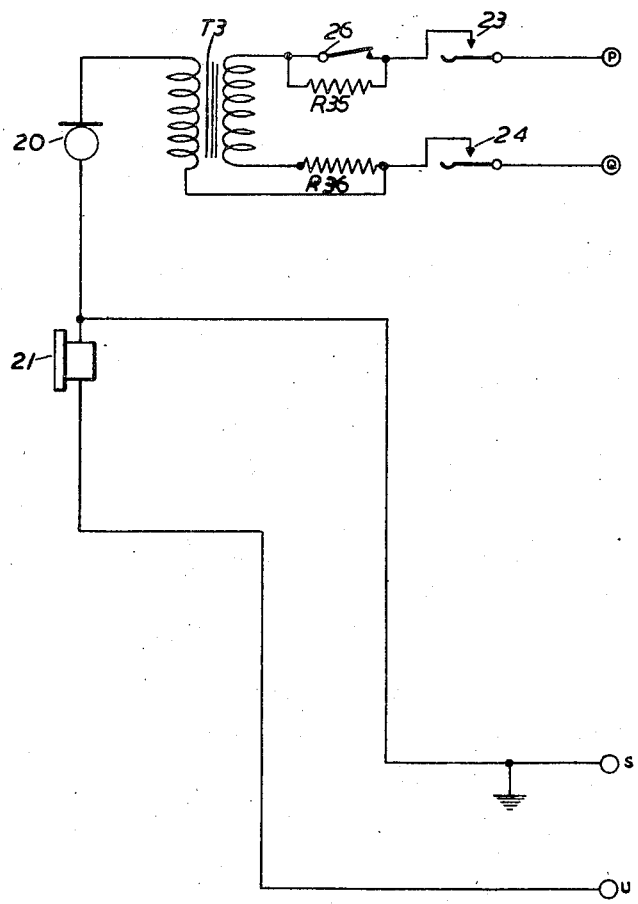
Figure 21:
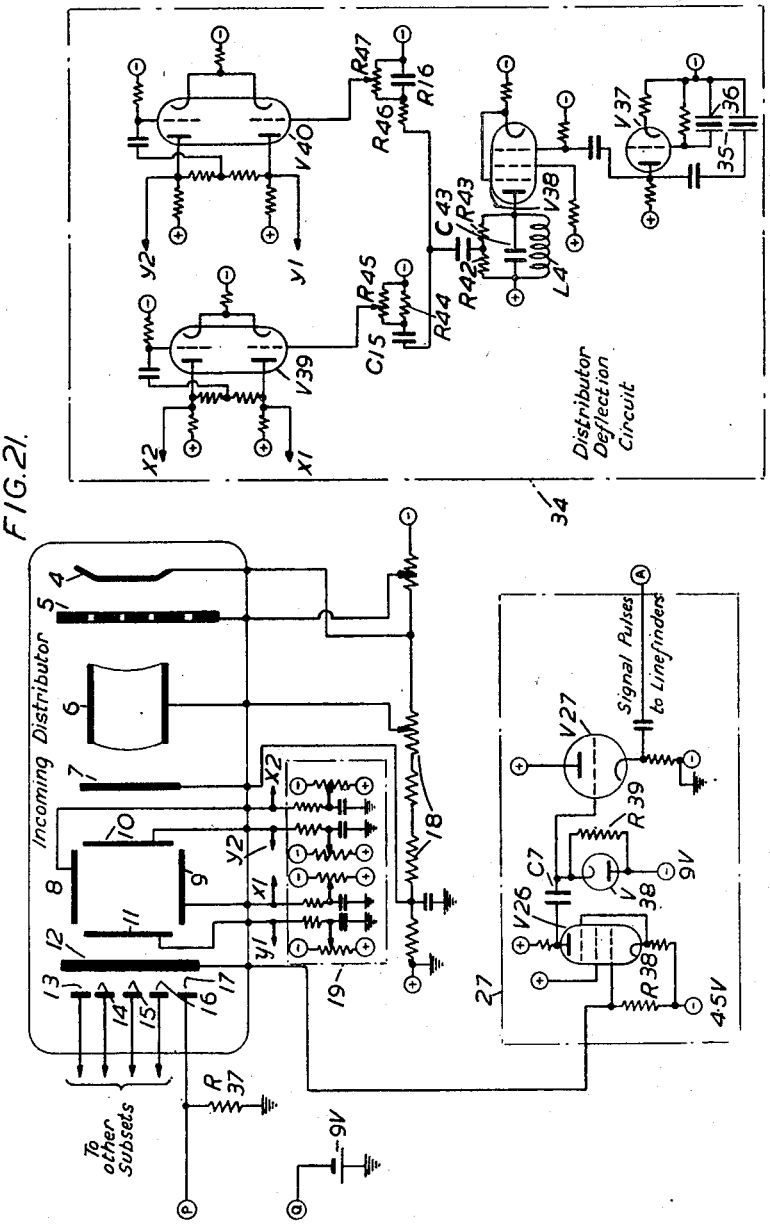
Figure 22:
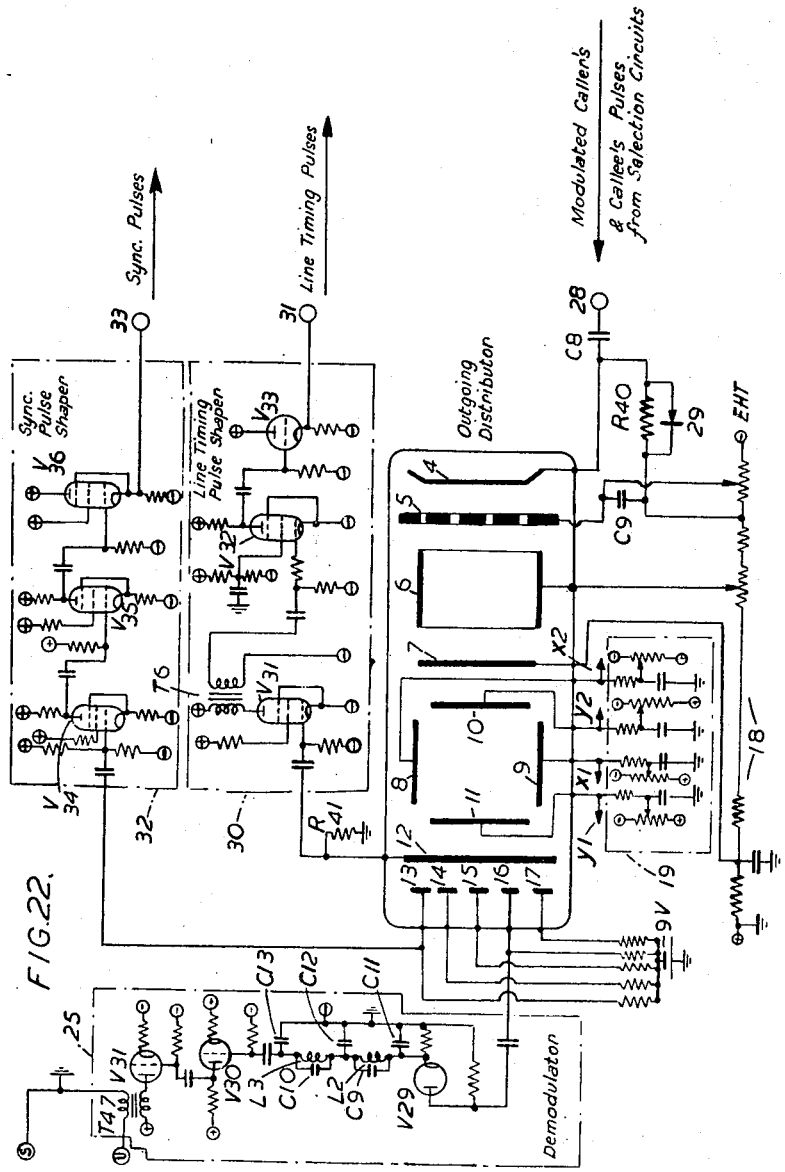
Figure 25:
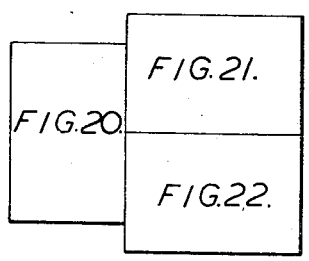

Figs. 20, 21 and 22, which should be placed together as indicated in Fig. 25, and read as one drawing, show the distributor circuits of a practical version of the embodiments described.

Fig. 26 (relating to the other embodiment) shows a gaseous discharge tube of a special type used as a time measuring device.

Fig. 27 (also relating to the other embodiment) shows a block schematic diagram of a linefinder using the gas discharge tube of Fig. 26 in the role of a time measuring device.

In both embodiments the role of distributor is filled by a cathode ray tube of which the cathode ray is deflected so as to sweep a circular path in a plane normal to the line of the beam in its central position and to scan in turn a number of target elements on which are terminated connections from the subscribers to the system. In addition there is a common anode having apertures through which the beam must pass to reach the individual target elements, and secondary emission between a target element and such common anode takes place when the beam scans a suitably biased target element. Such target elements are hereinafter referred to as "dynodes."

Various alternative distributor devices may however be used, electronic or electro-mechanical, with consequential modifications to the system which will be obvious to those versed in the art.

Figure 1:
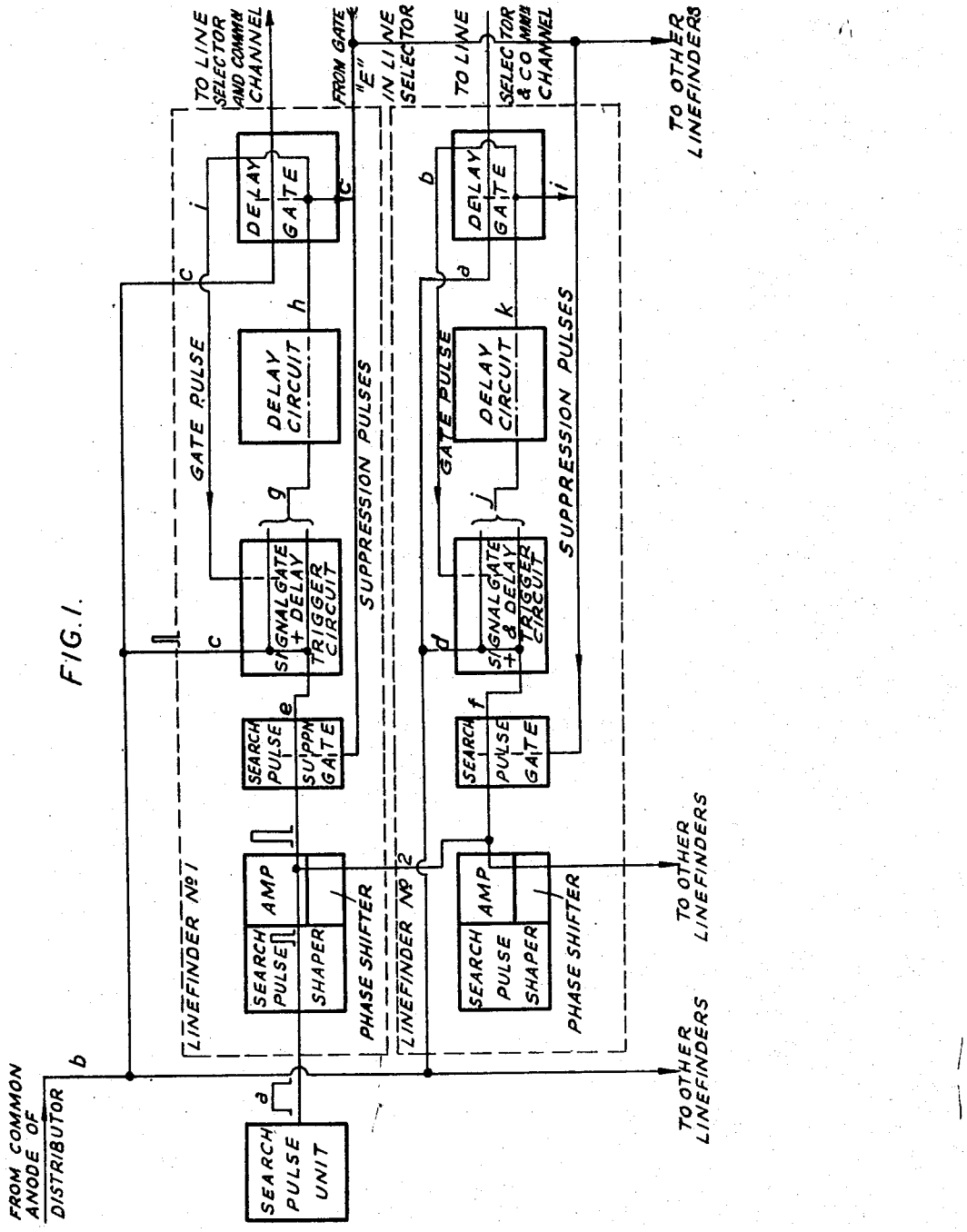
Fig. 1 is a block schematic diagram of two circuit arrangements having the role of line finders and hereafter called "linefinders."

Turning now to the first embodiment; from Fig. 1, it will be seen that there are several linefinders (though in special cases one only may be provided) into which the output of the common anode of the distributor is fed.

This output consists of pulses produced by the secondary emission from the various dynodes of the distributor and it is arranged that a pulse shall only be produced when the subscriber whose connection is attached to a dynode, signals the commencement of a call, for instance by lifting the hand set of a telephone instrument from its cradle and thereby suitably biassing the dynode. The dynode continues to produce pulses until the subscriber ends the call. A subscriber's dynode is also suitably biassed when he responds to a call. Any pulses so arising are fed to all the linefinders in common and, when several callers signal together the output of the common anode of the distributor will consist of a number of pulses occurring in succession in synchronism with the scanning of the various dynodes by the distributor in turn. The distributor scans continuously at a speed such that the repetitive pulse from any one dynode is capable of being modulated by the signals of the subscriber so that after demodulation such signals can be reproduced in their original form.

In the case of speech signals, for instance, a frequency of 10,000 scanning cycles per sec. has been used, though other frequencies may be used successfully for speech or other signals. The duration of the pulses must be such that adequate separation between different time positions is achieved. In the description which follows a pulse duration of 2 microseconds is quoted though other pulse widths may be used according to circumstances.

Line $b$ in Figs. 4 and 5 shows the pulses which would be delivered by the common member of the distributor if all subscribers initiated calls simultaneously, and the distributor there illustrated has 25 dynodes. The signal from the 25th dynode is enlarged in this line of the figures to indicate the terminations of the scanning cycles though its amplitude will usually be the same as all the others. The two lines $c$ and $d$ of Figs. 4 and 5 show the appearance of calling pulses by two callers on dynodes numbers 19 and 14 respectively.

The deflection of the beam of the distributor is produced by a circular time base circuit of known type and in the description which follows, the beam makes 10,000 complete rotations in a second, a frequency chosen for illustration.

A search pulse unit shown in Fig. 1 provides a pulse of equal on-off duration at a frequency greater or less, by a predetermined amount than the 10 kc./s. of the distributor cycle frequency.

This pulse is shown graphically in line $a$ of Figs. 4 and 5. This pulse is first fed into the search pulse shaper, amplifier and phase shifter of No. 1 linefinder where the pulse duration is reduced (to 20 microseconds for example), as shown in line $e$ in Figs. 4 and 5. Thereafter it passes, through the amplifier, to the other circuits of No. 1 linefinder, and also through the phase shifter to the similar circuit in No. 2 linefinder, where by virtue of different connections and circuit arrangements the now unnecessary steps of pulse shaping and amplification are omitted and the pulse is passed to other parts of No. 2 linefinder, as shown in line $f$ of Figs. 4 and 5, and also, via a phase displacement device to the next linefinder if any. The pulse is thus passed on from linefinder to linefinder with successive phase displacements. The figures only show two linefinders, for reasons of simplicity.

In each linefinder, the amplified search pulse passes through a search pulse "suppression gate," normally open, to a signal gate and delay trigger circuit which normally has no effective output. This circuit also has a connection from the common anode of the distributor, and when a caller's signal produces a pulse at a given time position in the distributor scanning cycle in the output from the said common anode, this pulse and the search pulse will eventually come into phase due to the deliberate difference in their frequencies, as will be obvious from a comparison of lines b and c Figs. 4 and 5. Though the same signal pulses are fed in common to the same point in all the linefinders, the search pulse and signal pulse cannot coincide at the same instant in any two or more linefinders owing to the phase displacement of the search pulse between linefinders. It will thus be seen that there are two sets of signals entering the signal gate and delay trigger circuit, of a linefinder, namely, the distributor common element signals arising at the time positions of any subscribers initiating a call, and the search pulses. The former are normally checked by a gate circuit in the signal gate and delay trigger circuit, and neither is sufficient by itself to operate the signal gate and delay trigger circuit initially. When a signal pulse and a search pulse coincide, however, the combined signal is of a level sufficient to pass a trigger pulse along connection g in Fig. 1, to the delay circuit. The first linefinder in which this coincidence occurs, triggers its delay circuit. Lines g and h of Fig. 4 and lines j and k in Fig. 5 illustrate this in respect of two linefinders.

In lines g and j of Figs. 4 and 5 a line above the horizontal axis indicates the threshold of sensitivity of the signal gate and delay trigger circuits. Only pulses extending above this line are capable of producing an output in connection g of Fig. 1.

The enlarged inset Fig. 4a shows the triggering of the delay circuit (line h) by the combined search pulse and signal pulse (line g). The delay period of the linefinder delay circuits is slightly less than the time period of the distributor scanning cycle (98 microseconds as against 100 microseconds in the example) and at the end of this delay period, the delay gate is opened. The linefinder delay circuits are of a type which is triggered by a pulse and thereafter is insensitive to further pulses during the delay period, as shown in black in lines h and k, Figs. 4 and 5. The delay gate has three functions, first, it passes a suppression pulse to the search pulse gates of all linefinders at the caller's time position in each cycle cutting off further search pulses from reaching the signal gate and delay trigger circuit of this and any other linefinder at this moment; secondly, it passes a gate pulse to its own signal gate and delay trigger circuit admitting the signal pulse of the calling subscriber to pass through to the delay circuit and re-trigger it at the required time intervals and thirdly, it opens itself to admit the passage of the caller's signal direct from the distributor to the line selector and communication channel.

All these three things take place for the first time when the signal pulse of the calling subscriber next after the one which originally found coincidence with the search pulse, occurs. The duration of the said suppression pulse, gate pulse and delay gate opening may be approximately 6 microseconds, thus bracketing the signal pulse.

Fig. 4, lines g, h and i, and Fig. 5, lines j, k and l illustrate this sequence of events taking place in each of two linefinders, in response to calls from subscribers 19 and 14 respectively.

The enlarged inset, Fig. 4b shows in more detail how, in the next distributor cycle after the coincidence of search pulse and signal pulse, the delay gate pulses (shown as a single pulse in line i) are started at the end of the 98 microsecond delay period of the delay circuit (line h) and the suppression pulse suppresses the search pulse, as shown by the diagonal hatching in line g below the line, this being effected in the search pulse suppression gate. The delay gate pulse is also shown opening the signal gate in line g, where it is horizontally hatched, to admit the passage of the caller's two micro-second signal pulse, which re-triggers the delay circuit (line h).

It will be noticed that, in the third search pulse along line g in Fig. 4, the search pulse coincides with the signal pulse of another caller, on dynode No. 14 of the distribtor, who has not yet been "found" by the linefinder. This operates on the signal gate and delay trigger circuit of No. 1 linefinder in the same way as did the original call which the linefinder "found." It will therefore pass a trigger pulse to its delay circuit at this instant but this can have no effect on the delay circuit as, once triggered, it will not respond to a second pulse during its delay period. It can be arranged, however, that such signals are blocked in the signal gate and delay trigger circuit.

The combined effect of these events is to start the delay circuit from the first coincidence of signal pulse and search pulse and thereafter to remove the search pulse and trigger the delay circuit by the calling subscriber's successive pulses alone. The signal gate and delay trigger circuit, the delay circuit and the delay gate then run continuously throughout the call, synchronized every 100 microseconds by the triggering of the delay circuit from the caller's signal pulse from the distributor anode.

The 6μ sec. suppression pulse is fed similarly and in common to the search pulse gates of all linefinders, blanking out the search pulse therein during a period of 6μ secs. bracketing the caller's time position in the distributor scanning cycle so that no other linefinder can be operated off that particular calling signal. The delay gate and signal gate and delay trigger circuit of the working linefinder remain insensitive at all other times than that of the 6μ secs. gating pulse bracketing the caller's time position so that another caller's signal cannot intrude upon this particular linefinder, though such other caller's signal is free to operate another linefinder.

Fig. 2 shows the means by which a connection is set up to another subscriber to the system, the broad principle of which is to open a gate at a time instant corresponding to the time position in the distributor scanning cycle of the subscriber with whom communication is desired, such time instant being selected by appropriate designation signals from the caller.

Two gates are in fact opened when the call has been set up, the delay gate in the linefinder, at the caller's time position and the gate referred to in the preceding paragraph, at the called party's time position in the distributor scanning cycle. The communication signals of both parties are thus selected from any signals of other subscribers and are mixed and, as will be explained later, finally passed to the receivers of the two parties' instruments.

This part of the equipment will now be described in more detail. The signal pulse of the calling subscriber has been traced, in relation to Fig. 1, through a linefinder to a point at which it emerges from the delay gate.

The signal so far described, has consisted of steady recurring pulses of constant amplitude. For line selection to take place, this pulse must be modulated in some way and this may consist of amplitude, time or pulse width modulation by designation signals which may take a variety of forms such as alternating potentials of one or a number of frequencies, of steady direct current impulses or any other form of signal which can be used to modulate the pulse output from the distributor anode. In this preferred embodiment amplitude modulation by direct current impulses at normal "dial" speeds, is used so that the amplitude of the caller's pulse is decreased for the duration of such impulses. Line 3 of Fig. 6 illustrates this.

In Fig. 2 the linefinder is indicated by the rectangle B, and the delay gate, which is the only part of a linefinder concerned with the setting up of a connection, is shown by the smaller rectangle C.

On emerging from the linefinder the pulses are passed to an integrator or demodulator D, the output of which consists of designation or other signals substantially in the form in which they were on reaching the distributor from the caller's instrument, as shown in line 6, Fig. 6.

A connection 5 leads to an integrator rectifier K which applies a steady direct current potential along connection 8 to the gate in a gate circuit and mixer L. This direct current commences when the caller's pulse from the distributor anode first emerges from the linefinder and it continues throughout the call.

A connection 6 leading from demodulator D, passes demodulated caller's signals to a designation signal filter and differentiator H, which may take the form of a low-pass filter and the function of which is to discriminate between designation signals and communication or other signals of the caller and, at the end of a designation signal impulse, to pass a trigger pulse to the delay circuit I, the delay of which is greater by a predetermined amount than the time period of one complete distributor scanning cycle. This predetermined amount is arranged so as to overlap one time position over and above one complete distributor scanning cycle, and a delay period of 104 microseconds is used in this embodiment.

The termination of a designation signal consisting of a single impulse thus results in a trigger pulse which triggers the delay circuit I and causes it to pas a positive 104 microsecond pulse along the connection 10 to the coincidence mixer J. Once triggered, the delay circuit is un-responsive to further pulses during the delay period.

In Figures 6, 7 and 8 the demodulated designation signal impulse leaving demodulator D is shown on line 6, the trigger pulse on line 9 and the output of the 104 microseconds delay circuit I, on line 10. At this point the operation of the gate circuit and mixer L will be examined.

At one particular itme position in the distributor scanning cycle a synchronising pulse (hereinafter abbreviated to "sync pulse") is produced. The sync pulse is of 2 microseconds duration and may be derived directly from the distributor or, alternatively, from the distributor time base circuit at an equivalent time position of the distributor scanning cycle. The sync pulse is applied from the source of sync pulses, shown as Q in Fig. 2, along connection 23, to the gate circuit and mixer L through which it passes all the time, whether the equipment is handling a call or not, and thence along connection 13, to a gate circuit M. This is shown in line 13 of Fig. 6, and the sequence of operations so far described, for setting up a connection can be seen to a larger scale in lines 12 and 13, 3, 6, 9, and 10 in Figures 7 and 8. The gate circuit and mixer L also receives a series of pulses, each of 2 microseconds duration, coinciding with the time positions allotted to the various subscribers to the system in the distributor scanning cycle and these pulses may be derived from the distributor direct or from the distributor time base circuit. These pulses are hereinafter called "line timing pulses."

When no call is occupying a line selector and communication channel, the line timing pulses are blocked by the gate in the gate circuit and mixer L. This gate is opened, however, by the direct current potential from the integrator rectifier K as soon as a caller's pulse passes into the line selector and communication channel. These puless now pass along connection 12 to the gate M which is normally open. The signals reaching the delay circuit N consist, therefore, of sync pulses only, when no call is in progress, and of sync pulses plus line timing pulses as soon as a caller's initial signal is selected by a linefinder. This is shown in lines 12 and 13 in Figs. 6, 7 and 8 where the sync pulses are shown as having greater amplitude than the line timing pulses, to distinguish between the two. In fact they will usually be of the same amplitude.

The delay circuit N is arranged so that it commences to measure the delay period when fed with a pulse and is insensitive to further pulses during the delay period. The delay introduced by this circuit is slightly less than the time period of one complete cycle of the distributor and in the embodiment described the delay is somewhat less than 100 microseconds. The circuit, therefore, is continuously running in step with the sync pulses when the equipment is not in use and even when the line timing pulses are introduced to its input, it remains insensitive to them. The output from the delay circuit N is a 6 microsecond pulse the leading edge of which coincides with the end of the delay period and the timing of which is such that it brackets the next sync pulse after the one which triggered the circuit. This is shown in lines marked N and 11, 17 and 18 in Figs. 7 and 8.

This 6 microsecond gating pulse from the delay circuit N is fed continuously to the coincidence mixer J where it has no effect until it is combined with a 104 microsecond pulse from the delay circuit I. It has been previously stated that one of these 104 microsecond pulses is produced every time a designation signal impulse is received from the caller and it is in random phase in relation to the distributor scanning cycle. The gate pulse from delay circuit N must therefore coincide once with a single 104 microsecond pulse during its duration, and at this time, a blanking pulse is produced by the coincidence mixer J and passes along connection 16 to the gate M where it suppreses one sync pulse or line timing pulse as the case may be, occurring at that time.

The coincidence of gating pulse and 104 microsecond pulse in the coincidence mixer, is shown in line J and the blanking pulse in line 16 of Figs. 6, 7 and 8.

As the gating pulses from delay circuit N are normally timed to bracket the sync pulses, the first designation signal will therefore cause the suppression of a sync pulse. Just prior to this sync pulse, the delay circuit N was standing ready to be triggered by it, and in its absence delay circuit N fails to trigger until it receives a later pulse. As line timing pulses are also passing through the gate M, the next pulse to reach the delay gate N will be the line timing pulse occurring next after the suppressed sync pulse, the gate M having opened again after the sync pulse time position. Delay circuit N now triggers from this line timing pulse and its next gating pulse coincides with the recurrence of this line timing pulse in the following cycle of the distributor. In the absence of any further designation signal impulses, this gate pulse from relay gate N will remain "locked" to this line timing pulse.

It might be thought possible for the 104 microsecond pulse from delay circuit I to coincide with two sync pulses but in practice this cannot happen because the suppression pulse from the coincidence mixer J will coincide with the first of such sync pulses and the failure of the delay circuit N to trigger at this moment will remove the gate pulse which would otherwise have coincided with the second of such sync pulses, and so the phase of the gate pulse cannot move two places for one designation signal.

A second designation signal impulse will also give rise to a suppression pulse in the gate M coinciding with the line timing pulse to which the delay gate M was locked and will cause it to trigger from the next succeeding line timing pulse, giving a gating pulse coinciding with that succeeding line timing pulse on its next appearance.

This process can be followed more readily by referring to Fig. 7, in the neighbourhood of the vertical co-ordinate marked with an asterisk along the top of the figure.

Along line N the end of the delay period of delay circuit N is observed. Immediately the gate pulse commences as shown along the lines marked 11, 17 and 18. The coincidence mixer J is seen along line J and the blanking pulse is shown along line 16. Soon after the inception of this blanking pulse, a sync pulse was due to enter delay circuit N and re-trigger it. This sync pulse is suppressed as shown in the line marked 14 and 15 in the position indicated by the arrow and the delay circuit N does not again trigger until the arrival of the line timing pulse next after the suppressed sync pulse.

It will be seen, by following line N, to the right, that delay circuit N retains its new phase until the process is repeated on receipt of another designation signal impulse, an event which is illustrated in Fig. 8.

The timing of the gate pulse from delay circuit N will thus alter in steps of one time position in the distributor scanning cycle for every designation signal impulse received from the caller and in this manner is the required connection established. The gate pulse continues to occur in the phase reached at the end of designation signalling, for the duration of the call.

On the termination of designation signals, the phase-shifted gate pulse from delay circuit N is fed along connection 17, to a "called" gate E which is opened during the pulse permitting the called subscribers' signal from the distributor anode to pass through it at the called subscriber's time position. The pasage of the called subscriber's signal pulses, through the gate E are illustrated in line 19 of Fig. 9. The phase-shifted gate pulses also pass to the search pulse gates in all linefinders where, superimposed on the suppression pulses from the linefinder delay gate, they prevent the selection of the called subscriber's line by a free linefinder when he answers the call, and thirdly to a mixer gate O. This can be seen from Fig. 2. Fig. 5 lines M and N, show, by dotted lines and arrows, the suppression of search pulses.

A mixer gate O has two gates, one opened by the gate pulse of the linefinder delay gate C and the other by the gate pulse of the delay circuit N.

These gates are opened, the one at the caller's time position, the other at the time position selected by the designation signal in manner aforesaid, which coincides with the called subscriber's time position.

These gates in mixer gate O are opened for 6 microseconds bracketing in each case a 2 microsecond pulse of the distributor anode. Line timing pulses are passed through these gates along connection 24, the correct pulses passing through and others being barred as shown in lines 4, 18 and 25 in Fig. 9 which traces the condition in mixer gate O. On leaving O the selected pulses go, by connection 25, to the modulator P, where they are modulated by communication signals of calling and called subscribers, received from amplifier mixer G along connection 21.

These communication signals are conveyed to modulator P in the following manner.

The delay gate C in the linefinder opens at the time necessary to pass the caller's signal pulses, which pass along connection 3 to the demodulator D as already described (shown on line 3 in Fig. 9), the signals press thence along connection 7 to amplifier mixer G. The called subscriber's signals pass straight from the distributor anode (with all other signals in time sequence) to gate E which is opened at the appropriate time by the gate pulse from delay circuit N along connection 17 (shown on line 17 in Fig. 9). The signals of the called subscriber are selected from the rest and passed to demodulator F and thence along connection 20 to amplifier mixed G where they meet the caller's signals from demoduator D (as shown on line 21 of Fig. 9), and the two are mixed and amplified and passed to modulator P where both signals modulate both line timing pulses passed by the mixer gate O. The modulated pulses are then passed to an electrode in the distributor where they vary the beam intensity in step with the modulating signals at the time position of the calling and called subscribers and cause fluctuating secondary emission currents to appear between the common anode and dynodes connected to calling and called subscribers' instruments and after demodulation such signals can be made to actuate receiving apparatus. This is shown along line A of Fig. 9 where small pulses are shown in each time position of the distributor scanning cycle, to show the scanning frequency. Actually only the pulses of calling and called parties in the system are present. Both parties receive their own signals as well as those of the other party but this is of no moment and has the result of "side tone" which can be balanced out to a suitable degree by opposing it with a proportion of the transmitted signal in reversed phase.

Figure 3:
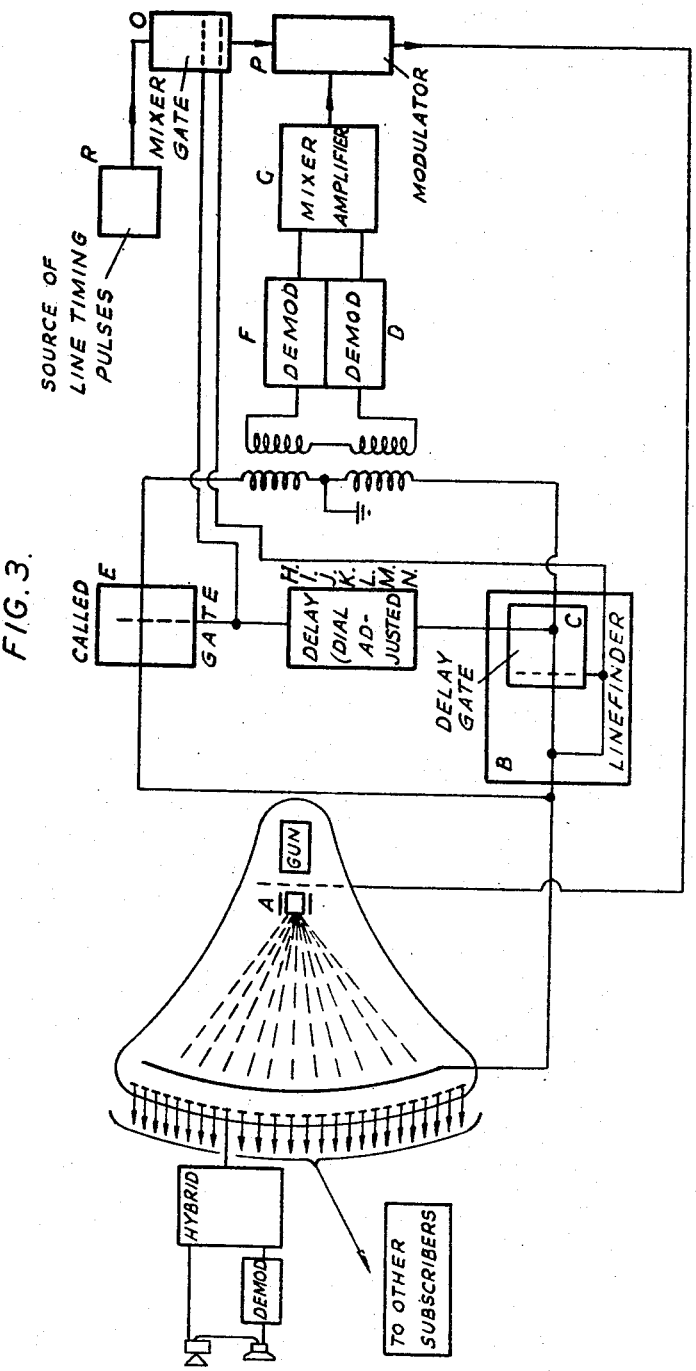
Fig. 3 is a block schematic diagram of a communication link individual to a linefinder and line selector.

Fig. 3 illustrates the elements of the communication link, set up in manner described in relation to Fig. 2, in a simpler form, shorn of the complication of the line selector parts of the equipment and requires no further explanation except to point out that the reference letters of Fig. 2 are repeated in Figure 3 to show the parts of the two figures which correspond.

Figs. 10 to 19 inclusive show an embodiment in greater detail. Figs. 10, 11, 12, 13 which should be placed together respectively top left, top right, bottom left, bottom right, and read as one figure, make a block schematic diagram of a system comprising two linefinders and two line selection units, the distributor or distributors being not shown. From these figures it will be seen that the units of equipment actually used in the embodiment are more numerous and elaborate than the functional blocks in Figures 1, 2 and 3, though Figures 4 to 9 inclusive are equally valid as showing waveforms at various parts of the circuits.

Figs. 14, 15, 16, 17, 18 and 19 should be placed together in a horizontal line, in the order named, from left to right, and read as one drawing.

Figs. 14, 15 and 16, show one linefinder and certain parts of another to illustrate interconnections between the two, and correspond to Fig. 10.

Figs. 17, 18 and 19 show a line selector and correspond to Fig. 11.

The circuit elements in Figs. 14 to 19 inclusive are divided into sections corresponding to the blocks in Figs. 10 to 13 inclusive and are similarly named and numbered in the two sets of figures.

The detailed description which follows will be related to Figs. 14 to 19, the purpose of Figs. 10 to 13 being to enable the basic functions and general arrangement of the circuit elements to be seen at a glance.

Fig. 14 includes a diagrammatic representation of one distributor to which incoming signals from subscribers are applied. There is a second distributor in this embodiment which deals with outgoing signals to the receiving parts of the subscribers' apparatus. A cathode ray type of distributor is illustrated, but of course, other distributors (preferably electronic) could be used, for instance, the distributor described in application Ser. No. 777,818, filed October 3, 1947.

The other circuits in Fig. 14 are common to all linefinder units connected to a given distributor or pair of distributors.

Block 1, the search oscillator, is a conventional tuned anode oscillator, using a pentode V1, the anode inductance L1 being tuned by condenser C1, to a frequency within about 10% of 10 kc./s.

It will be remembered that the search pulse frequency differs in frequency from the distributor frequency in order that they drift into phase.

The output at V1 anode is a sine wave of about 30 volts peak amplitude, and this is fed to the grid of V2 in block 2, amplifier and buffer, the grid swing being adjusted by the potentiometer R1, R2 so that V2 operates as a class A amplifier giving a sine wave output at its anode, of about 150 volts peak amplitude.

Block 3, pulse squarer has a pentode V3, with its control grid biassed by grid current developing the bias voltage across R3, a relatively high resistance "grid stopper." A value of 22,000 ohms is suitable.

V3 has a short grid base and is driven to cut off on negative half cycles and to maximum anode current on positive half cycles of the sine wave form received from V2 and the voltages developed at the anode of V3 are square pulses of approximately equal on-off periods.

These square pulses are applied to the first of the linefinders and are shown on Fig. 14 as applied to a terminal B. A similar terminal shows the connection incoming to block 4 in Fig. 15.

The connection from the common anode of distributor 1 similarly terminates in a terminal A.

This system of denoting connections which pass from one figure to another, is used throughout Figs. 14 to 19 and where a connection passes right across one of the figures it retains the same terminal references at both sides of the figure.

In places these terminal letter references will be used also to denote the connections themselves.

Terminal B pulses appear on line A of Fig. 4. Their positive going leading edges are differentiated by feed condenser C2 (block 3), resistance R4 (block 4) and the diode V4, being bypassed to ground by V4. The negative going edges are also differentiated, but through C2, R4, R5 and R6, the time constant of which is about 50 microseconds.

Block 4, pulse shaper and phase shift, also contains a triode V5 whose grid is connected to positive H. T. via resistance R6 and its anode is normally at a minimum potential.

The negative pulses from the differentiation circuit C2, R4, R5 and R6 cut off the valve causing positive pulses to appear at the anode of V5, and the circuit constants are adjusted so that the valve is cut off for 20 micro-seconds, the anode pulses being of this duration.

These pulses are hereinafter called the search lock pulses to distinguish them from the longer search pulses from block 3.

These pulses are applied to a similar circuit in the next linefinder shown below the dotted line in Fig. 15 as block 4'. A similar differentiation circuit and diode, suppresses the leading edges of the search lock pulses from V5 anode and applies the negative trailing edges to the grid of V5 of the next linefinder (block 4'), which cuts off for 20 micro-seconds, following the cutting off of V5 in block 4 with a slight interval between the two pulses due to the slight time lag in the cutting off of V5 in block 4'. The pulses of V5 are similarly passed to the next linefinder if there is one, and similar delayed pulses result. Thus the search lock pulse starts in the first linefinder and is repeated in the linefinders in turn, never occurring in two simultaneously.

From V5 anode, in block 4 the search lock pulses pass to the control grid of V6 in block 5, search pulse gate.

V6 is normally cut off on its control grid as its cathode is held positive by potentiometers R7 and R8. The suppressor grid is connected to positive H. T. through a series resistance R9 and is normally "open."

The search lock pulses open the control grid of V6 causing negative 20 microsecond pulses to appear on its anode, of about 100 volts amplitude.

V6 can, however, be cut off by negative pulses from connection E. Such pulses come from the mixer gate, block 14 in Fig. 16, when a linefinder has locked to a call. The search lock pulses are eliminated at such time. Line e of Figs. 4 and 5 shows this, the eliminated portions of the search lock pulses being shown cross-hatched.

Block 6, phase inverter, is conventional, having a triode V7, normally passing maximum anode current, with its grid at cathode potential, but cut off by the negative pulses from V6 anode.

Block 7, mixer cathode follower, has two inputs to the grids of two triodes V8 and V9 with common anode and cathode circuits.

Positive search lock pulses appear on the grid of V8, and when the linefinder has locked to a cell, gate pulses appear on the grid of V9. Either or both cause positive pulses at the cathodes of the two valves which are fed to block 8.

It will be remembered that the search pulse (now called the search lock pulse) is required to synchronise with a caller's signal pulse from the distributor, when the two have drifted into phase, whereafter a delay circuit is triggered, producing a gate pulse at the end of its delay period which suppresses the search pulse and retriggers the delay circuit at the phase of the selected channel.

V8 receives the search lock pulses, but these are cut off at a caller's time position when a gate pulse from block 14 cuts off V6 (block 5) and something must take their place to retrigger the delay circuit. This is carried out in block 7, V9 taking over, driven by gate pulses, when V8 fails, due to suppression of search lock pulses.

Block 8 has a pentode V10 whose cathode is held positive in relation to its control and suppressor grids by potentiometer R9, R10. Normally, therefore, the valve is cut off.

There are two inputs to block 8, one from block 7, consisting of search lock pulses and/or gate pulses, applied to V10 suppressor grid, the other, distributor pulses from connection A, applied to V10 control grid. All these are positive pulses, but only when there is an input to both grids, will the valve conduct.

When, therefore, a subscriber initiates a call, the anode of the distributor will transmit a positive pulse when the beam sweeps the target element connected to his line and this pulse will appear repeatedly at the time position allotted to this subscriber, in the distributor scanning cycle. Nothing will happen, however, until a search lock pulse also appears from block 7, which will happen when the two have drifted into phase.

Then, during the coincidence only, will a pulse appear at the anode of V10 and this will take place during the 2 microsecond calling pulse from connection A.

After this, the gate pulse will appear and suppress the search lock pulse at the timings of these calling pulses, in future cycles, but the gate pulse, applied to V9, will produce a gate pulse on V10 to let the calling pulses through. From this time, till the end of the call, the delay circuit, by producing gating pulses at the correct timing, holds the linefinder locked to this phase and the search lock pulse having done its work, is barred from interfering with this locking.

Block 9, first signal gate phase inverter has a triode V11, whose grid is connected to H. T. positive through resistance R11. It therefore normally passes maximum anode current, to be cut off by the signal pulses from V10. This circuit arrangement gives about 80 volt positive pulses at the anode of V11.

Block 10 contains a pentode V12 with a diode V13 across its suppressor and cathode (anode to suppressor and cathode to cathode).

V12 is normally cut off by its cathode being biassed about 15 volts positive with respect to its control grid by potentiometer R12, R13. The suppressor is connected to the cathode via resistances R14 and R15 and will therefore allow V12 to conduct when positive pulses are applied to its control grid.

Gate pulses are also applied to its suppressor grid from block 13 through condenser C3.

When the first pulse comes from block 9 therefor (on a calling pulse synchronizing with a search lock pulse), V12 will emit a negative pulse at its anode to trigger the delay circuits and at the end of the delay period a gate pulse will be applied to the suppressor. This pulse is positive and will pass through the diode V13, which prevents the suppressor rising more positive. When the gate pulse ceases, however, the negative-going trailing edge of this gate pulse drives C3 and the suppressor negative, where it remains till the next gate pulse which now drives the suppressor of V12 to its original positive level whence it goes negative again after the pulse. This is a familiar television "D. C. restoring" circuit.

V12 therefore, after the first search lock pulse, and after the gate pulse succeeding it, is cut off on its suppressor grid except when it is "opened up" during the gate pulse. It is only able to conduct however, when the calling pulse through blocks 8 and 9 is present on its grid, and it becomes a gate, opened by the gate pulse to admit this pulse.

The need for such a gate arises from the fact that block 7 emits search lock pulses at all times except when they are suppressed by the action of the gate pulse on block 5 (search pulse gate) and these search lock pulses from block 7, combined with signal pulses of other channels, cause output pulses from block 8, coincident with these other channel pulses, which pass, through block 9, to the control grid of V12. If this path were not left open, there would be no means of applying to the delay circuits, the initial pulse arising from the coincidence of the initial calling subscriber's pulse from the distributor with a search lock pulse.

The delay circuit of Fig. 1 is represented by the two blocks 11 and 12, first delay circuit and second delay circuit respectively. Each incorporates a pentode and two diodes. The delay circuits of blocks 30 and 34 in Fig. 18, in the selection circuits, are almost identical, and all these delay circuits are of the type described in application Serial No. 777,761, filed October 4, 1946 in relation to Figs. 5F and 5G of the drawings accompanying that specification.

Take the first delay circuit for instance. Initially the voltage on the suppressor grid of V18' is 20 volts positive, on the cathode of V19' 42 volts, and on the cathode of V18' 46 volts. Different voltages may be used but they should bear substantially the same relative relations. The diode V19' is conducting and the control grid of V18' is maintained at about 42 volts positive. The suppressor grid of V18' is negative with respect to its cathode and V18' does not pass anode current. The voltage at the anode of V18' tends to rise to the full high tension supply voltage but the tendency is arrested at a voltage slightly above the voltage at the wiper of the potentiometer R63' because the diode V17' becomes conducting at this point.

Owing to the value chosen for R72', a comparatively large screen current flows and the potential of V18' cathode is initially determined largely by the screen current, and is preferably some twenty volts positive in relation to the suppressor grid voltage of V18' in the quiescent condition of the delay circuit.

The input to the circuit consists of a negative pulse of approximately 40 volts amplitude from block 10 applied to the cathode of V17' which causes a drop in the anode voltage at V18' which is transmitted to the grid of V18' by a condenser C29' and is "followed" by the cathode of V18'.

The cycle of operations in this delay circuit has six stages, as follows:

Stage 1

As V18' cathode voltage falls, V18' suppressor grid voltage soon becomes positive with respect to the cathode and causes anode current to flow.

Anode load R68' is large and the anode voltage falls rendering V17' non-conducting. The continued fall of the cathode voltage of V18', following the control grid and anode voltage fall, increases the anode current of V18' because the suppressor grid becomes more positive with respect to the cathode.

The change is cumulative and the anode voltage falls rapidly till the control grid falling with it approaches the cut-off voltage.

Stage 2

At this point the screen grid current is almost cut-off by the falling grid potential.

The condenser C29' now charges up slowly through R71' which has a high resistance. This permits the control grid voltage of V18' to rise slowly, followed by the cathode. The rise of the grid voltage enables the screen grid current to rise slowly and the screen grid voltage to fall correspondingly slowly.

The rise of the grid voltage also enables a slowly increasing anode current to flow, causing a corresponding continued fall of the anode voltage. This anode potential fall is practically linear due to the feedback action and this stage continues for a relatively long period occupying the major portion of the delay period during which further pulses at the cathode of V17' cannot effect the operation of the circuit since V17' remains non-conducting.

Stage 3

When the anode voltage of V18' has nearly reached that of the cathode a short period occurs when the anode current and consequently the anode voltage becomes constant. The feedback from the anode then ceases to operate so that the cathode and the grid potentials begin to rise much more rapidly and in an exponential manner until the cathode relative to that of the suppressor grid approaches the cut-off point of the leader when the anode current is again cut-off. In the meantime, the screen grid current rises sharply owing to the rising grid potential and the screen grid voltage falls proportionately.

Stage 4

This stage begins at the point where the suppressor grid reaches the cut-off point and occupies the time taken by the grid of V18' but rises to the point at which V19' again becomes conducting, arresting the rise at the 42 volts applied to the cathode of V19'.

The screen current rises to a maximum and the screen voltage falls to a minimum during this period.

Stage 5

The potential at the grid end of C29' can now rise no further owing to V19' becoming conducting and the anode voltage rises exponentially until it reaches the potential of the wiper of R63' when V17' again conducts and the anode voltage can rise no further.

Stage 6

The circuit is now again in its quiescent condition ready to receive another trigger pulse.

The output of the circuit is taken from the second grid of V18' in the form of a positive pulse of a length corresponding substantially to the time taken by Stages 1, 2 and 3 of the above-described sequence of operations.

These delay circuits are of the type which is responsive to a trigger pulse and thereafter remains unresponsive to any pulse during the major part of the delay period, towards the end of which, it recovers to the responsive condition. This recovery cannot easily be defined with sufficient accuracy to ensure that the circuit is next triggered from a pulse of the correct channel, there is no difficulty, however, in producing an accurately timed pulse at the end of the delay period.

For this reason, two delay circuits are used, the second triggered by the pulse occurring at the end of the delay period of the first, allowing the first delay circuit the whole delay period of the second, to recover to the responsive condition.

During this period, the first delay circuit must be protected from false triggering by pulses of other channels and transients. This is another function of block 10 (second signal gate).

If one delay circuit of the type described, could be made sufficiently reliable in respect of the time of recovery, block 10 could be omitted, since the irresponsiveness of the delay circuit, to pulses during its delay period, would perform the function of block 10.

Negative pulses from block 12 are applied to the grid of a triode V14 in block 13 (gate pulse producer). This circuit is similar to that of block 4. The negative pulses are differentiated by condensers C4 in block 12, and resistances R16, 17 and 18 in block 13. V14 is normally fully conducting as its grid is tied to H. T. positive through R18, but is cut off by the negative differentiation peaks, for a time governed by the time constant of the circuit, which is arranged to be 6 micro-seconds.

Any positive going pulses from block 12, are by-passed by a diode V15 connected between the junction of R16 and R17 and V14 cathode. Positive gating pulses of 6 micro-seconds duration are taken from the anode of V14, through a feed condenser C5, to terminal D.

Turning now to Fig. 16, gate pulses from terminal D are applied to the grid of V16, one of two triodes V16 and V17 in block 14, suppression pulse mixer. This block is similar to block 7. The valves V16 and V17 are normally biassed to cut off their cathodes being held at a positive potential by potentiometer R19, R20.

Gating pulses from terminal D render V16 conducting and similar pulses from the selection circuits timed so as to bracket the signal pulses from the distributor at the time position of a called subscriber selected by the selection circuits, render V17 conducting.

Negative pulses of 6 micro-seconds duration appear on the interconnected anodes of V16 and V17 at the caller's and callee's time positions and are taken to terminals E and E1 whence they are applied to the search pulse gates of the linefinder in question, and any other linefinders, respectively.

The common anode load R21, of V16 and V17, is common to the suppression pulse mixers of all linefinders so that all calling and called parties on all linefinders cause suppression pulses which suppress the search lock pulses in all search pulse gates in all linefinders, thus preventing interference between calls and also preventing a called subscriber from being appropriated by a free linefinder when responding to a call. Such response causes a pulse from the distributor at the called subscriber's time position.

The connection from R21 to another linefinder suppression pulse mixer block 14' is shown in Fig. 16.

The gate pulse from terminal D and the callee's suppression pulse from terminal J, coming from the selection circuits are respectively taken to the suppressor grids of V18 and V19 in blocks 15 and 16, calling subscriber's gate and called subscriber's gate, respectively.

These two valves have their control grids connected to connection A from the distributor anode.

Both valves have their cathodes at a positive potential by connection to potentiometers R22, R23 and R24, R25, respectively, and the valves are normally cut off on their control and suppressor grids.

V18 is "opened" by the coincidence of the calling subscriber's pulse from A and the gate pulse D, whilst V19 is "opened" by the coincidence of the callee's pulse from A and the suppression pulse from J.

Outputs from the two gates are taken from the anodes of V18 and V19 to terminals F and G respectively.

This completes the description of a linefinder.

Figs. 17, 18 and 19 show a selection circuit one of which is associated with each linefinder.

Circuits of this type and their operation are described in detail in application Serial No. 777,761, filed October 4, 1946 and it is proposed to describe only the differences between those circuits and the circuits of Figs. 17, 18 and 19 which consist of the addition of blocks 17, 36, 34, 35 and 39 to the former circuits.

The following table of corresponding figures will assist in comparing Figs. 17, 18 and 19 with the corresponding parts of the circuits described in the said application.

| Block No. in the drawings accompanying this Specification | Fig. No. in application Serial No. 777761 |
|---|---|
| Fig. 17 {18, 19, 20, 24, 25, 26} | Fig. 4 {4D, 4A, 4B, 4C}; Fig. 5 {5A, 5B} |
| Fig. 18 {21, 22, 23, 33, 27, 28, 29, 30, 31} | Fig. 4 {4E, 4F, 4G, 4H}; Fig. 5 {5C, 5D, 5E, 5F, 5G, 5H} |
| Fig. 19—32 | |

In application Serial No. 777,761, in relation to Fig. 3 of the drawings accompanying that specification, "signal pulses" are shown as applied direct to a block 4D, which corresponds to block 18 on Fig. 17 accompanying this specification.

For the purposes of the present invention, the "signal pulses," of application Serial No. 777,761, correspond to designation signals, which take the form of amplitude changes in the pulses at a caller's time position, the amplitude change being of constant amount and continuing for the duration of a designation signal impulse generated by the caller's instrument. If an ordinary dial were to be used, these amplitude changes would last about $\frac{1}{10}$ of a second. The functions of such signals, in selecting a phase corresponding to the called substation, are the same as those described in application Ser. No. 777,761.

Once such a phase is selected, however, it is necessary, for the purposes of this invention to pass intelligence generated by caller and callee.

Reverting for a moment to Fig. 16, it will be recalled that the pulses from the distributor at the caller's and callee's time positions are "gated" through blocks 15 and 16 respectively, and appear on terminals F and G.

In Fig. 17 these terminals lead to block 17 where they are applied to parallel windings of transformers T1 and T2 respectively and another winding of each transformer is connected to V20, the two being in series between V20 control grid and earth.

V20 is normally biassed to cut off by the connection of its cathode to potentiometer R26, R27, and pulses from terminals F and G are of sufficient amplitude even when reduced to their minimum value by the troughs of amplitude modulation to render V20 conducting. T1 and T2 are connected so that these pulses produce positive potentials on the grid of V20 and the anode of V20 produces negative replicas of these pulses, considerably amplified.

The pulses of both parties are now combined in a single connection, though still retaining their individual time positions.

These amplified pulses are now demodulated in block 18 in the same way as in block 4D of Fig. 3 accompanying application Serial No. 777,761, but whereas in that specification the demodulated signals are passed only to a discriminator block 4E (corresponding to block 24, Fig. 18 of the drawings accompanying this specification), in this invention, not only signals, corresponding to a caller's designation signals, but also other intelligence from the caller, and from the callee when selection is complete and callee's gate block 16, Fig. 16 is opened at the selected time position, is passed from demodulator, block 18, to an amplifier stage block 36 which is a conventional class A audio frequency amplifier. The output of this amplifier consists of the mixed audio frequency intelligence originating from the caller and (when selected) the callee. The intelligence is passed to modulator, block 39, Fig. 19. Designation signals of a caller also appear at the input to block 39 but it will be seen later that this modulator is ineffective until such designation signals have caused the selection of a callee's time position so that block 39 is in practice only concerned with the said other intelligence.

The process of selection described in application Serial No. 777,761 is completed by the emission of a gate pulse at the selected time position from an output pulse producer block 5H, Fig. 3 of the drawings accompanying that specification. The corresponding block in the figures accompanying this specification is block 32, Fig. 19. The "gate pulse" of application Serial No. 777,761 is here re-named a "suppression pulse"

as the term "gate pulse" has previously been used with another meaning. This suppression pulse is passed back to the linefinder where, as already mentioned, it opens the callee's gate block 16, Fig. 16, at the correct time to pass pulses from the distributor, at the callee's time position, and it is also passed to the suppression pulse mixer, block 14, of the first linefinder where it is conveyed to all linefinders to close their search pulse gates (block 5) to prevent any linefinder "finding" a called parties' signals when a call is answered.

The suppression pulse is also passed to the new block 34, the mixer gate, which is fed also with caller's gate pulses from the linefinder (along connection D).

These suppression pulses and gate pulses are taken to block 34, mixer gate where they are applied to separate diodes V21 and V22 having a common cathode lead R28, from which voltages are applied to the suppressor grid of V23. The diodes are normally nonconducting and each conducts only when a pulse appears on its anode, so that suppression pulses are kept out of connection D and caller's gate pulses are kept out of connection J.

V23 is a gating tube normally cut off on suppressor and control grids by the connection of its cathode to potentiometer R29, R30. The suppressor grid is "opened" by gate pulses at the caller's time position and suppression pulses at the callee's time position and pulses are applied to the control grid from a source of "line timing pulses" which consist of pulses synchronous with the pulses allotted to various subscribers to the system, in the scanning cycle of the distributors and may be derived from one of the distributors or from the sweep circuits for the distributors.

V23 therefore, conducts only at the time positions of caller and callee, selected from other line timing pulses, by the gate pulses and suppression pulses applied to its suppressor grid. Negative pulses appear at V23 anode at these time positions.

These pulses are applied to the control grid of V24 in block 35, phase inverter, which is normally held positive being connected to positive H. T. through R31, and V24 is normally fully conducting. It is cut off by the negative pulses from block 34 and at such times its anode rises positive, emitting positive pulses via condenser C6 to the control grid of valve V25 in the modulator, block 39.

V25 is normally cut off on its control grid by the connection of its cathode to potentiometer R32, R33, but not so its suppressor grid, a valve with a long "suppressor base" being chosen.

The demodulated signals from block 36 are connected via terminals and connection K to the suppressor grid of V25 and when the valve is "opened" on its control grid, by pulses from phase inverter, block 35, pulses appear on the anode of V25 the amplitude of which is governed by the instantaneous value of the signals from connection K. The pulses at the caller's and callee's time positions are thus amplitude modulated by the combined intelligence of both caller and callee and are passed to the grid or other controlling member of an outgoing distributor causing energy to be applied to scanned members of the distributor assigned to caller and callee by the timing of such pulses, the value of the energy being varied in step with the modulating intelligence.

An outgoing distributor 2 of the cathode ray type is shown in Fig. 19, the modulated pulses being applied to a grid 3, to control the intensity of the cathode beam, whereby the current passing from dynodes to common anode is varied according to the instantaneous intensity of the said beam when it scans any given dynode.

The extraneous circuits of the distributor are shown in skeleton only.

A more detailed description will now be given of the two distributors used in the embodiment described above and of the circuits connected reference being had to Figs. 21 and 22.

The distributors are of the cathode ray type and are identical. Each has a cathode 4, a control grid 5, a focussing electrode 6, an accelerating anode 7, "X" deflector plates 8 and 9 and "Y" deflector plates 10, and 11, a common anode 12, and dynodes, five only of which are shown to simplify the drawing, numbered 13, 14, 15, 16 and 17. These elements, except the common anode and the dynodes follow normal cathode ray tube practice and serve to project a cathode ray which is deflected by the deflector plates and controlled in intensity by the grid.

A source of extra high tension (hereinafter referred to as the "E. H. T. supply") is provided and a potentiometer 18 is connected across it, from various tappings of which the various potentials for the tube elements are provided. The E. H. T. supply has its positive pole earthed.

The grid is connected to the most negative end of 18 and the other elements are connected to various points progressively more positive, in the following order: Cathode, focussing electrode, accelerating anode deflector plates, common anode and dynodes, the two last being earthed via separate bias voltage supply sources.

Each deflector plate is individually biassed by a separate potentiometer and these potentiometers, shown separately in Figs. 21 and 22 and indicated by numeral 19, are in fact connected in parallel with one another and with the last section of 18 at the positive or earth end.

The common anode is pierced opposite the dynodes so that the cathode ray passes through an aperture and strikes a dynode, when it passes an aperture.

The dynodes and apertures are arranged in substantially circular formation and the cathode ray is caused to sweep continuously in a circular path by means of a distributor sweep circuit shown in Fig. 21 and later described in detail.

When a dynode is biassed negative in relation to the common anode, secondary emission takes place between the two when the cathode ray falls upon the former. The current which then flows, produces a pulse in external circuits to be described. As the beam traverses the dynodes therefore, the dynodes cause pulses in their individual circuits in turn. The amplitude of these pulses can be varied by varying the dynode-to-common-anode bias or by varying the intensity of the cathode ray by varying the bias on the grid 5.

The description so far, relates to one tube but applies equally to the incoming distributor in Fig. 21 and the outgoing distributor in Fig. 22.

Fig. 20 shows a subscriber's instrument having a microphone 20, and a receiver 21. The former is connected to one end of a winding of a transformer T3 and to the receiver. The other winding of T3 is connected to the junction of R36 and contact 24.

From the junction of microphone 20 and receiver 21 a connection is made to a terminal S and the other side of 21 is connected to a fourth terminal U.

Four wires join the subset to the two distributors and they will be referred to by the same letters as the terminals they are attached to.

Wire P goes to a dynode of the incoming distributor which is earthed through a resistance R37. Wire Q goes via a source of bias potential delivering 9 volts, to earth.

When P and Q are "looped" at the subset, a bias is applied to the corresponding dynode.

Wires S and U are connected to the output side of a demodulator 25 which is connected at its input end to a dynode of the outgoing distributor. Only one of these is shown, in Fig. 22.

Each subscriber has an instrument as illustrated in Fig. 20 and each one is connected in the manner described to a dynode of the incoming distributor and to an individual demodulator 25 associated with an individual dynode of the outgoing distributor.

When a subscriber wishes to call he lifts his handset and closes 23 and 24.

This puts a loop on terminals P and Q through 23, R35 (normally short circuited by contracts 26 connected to the dial or other designation signalling device), the right hand winding of T3, R36 and 24.

The corresponding dynode of the incoming distributor is then biassed as previously explained.

In addition, operation potential is applied to microphone 20 from earth and 9 volt battery wire Q, 24, left-hand winding of T3, 26, wire S, to earth connected to terminal S in Fig. 22.

Currents generated in 20 reduce or diminish the bias on the corresponding dynode of the incoming distributor, dynode 17 only being shown connected in Fig. 21.

The dial or other designation signalling device produces impulses by opening contacts 26, inserting the resistance of R35 in series with the dynode bias circuit and momentarily reducing the bias.

During these impulses, the bias is reduced and the amplitude of the pulses from common anode 12 of the incoming distributor is reduced. It will be explained how these reduced amplitude pulses are passed to the linefinder. From the linefinder through which they pass, the pulses modulated by designation signals go to mixer 17, demodulator 18 and discriminator 21 (see Fig. 11), to cause selection of the required callee's time position.

The common anode 12 of the incoming distributor does not produce pulses except when a dynode having bias is swept by the cathode ray. When, therefore, and not until, a subscriber lifts his handset and biasses his dynode through cradle switch contacts 23 and 24, pulses start to issue from the common anode at his time position in the distributor scanning cycle.

The common anode 12 of the incoming distributor is connected to a coupling circuit 27 (shown in Fig. 21), being connected to the grid of a valve V26 therein, and also to a source of 4.5 volts negative bias through a resistance R. The purpose of this negative bias is to provide a voltage between the common anode and any dynode not connected to the 9 volt negative bias source connected to terminal Q, sufficient to neutralise any energy imparted to the dynode by the cathode ray, such dynode being earthed through R37. This ensures that no pulse occurs when the cathode ray passes an unbiassed dynode. V26 is a conventional linear amplifier and from its anode positive pulses are passed through coupling condenser C7, to the grid of a triode cathode following stage V27 whose grid is passed to a separate source of 9 volts negative bias through a diode V28, bridged by resistance R39. V28 and R39 act as a D. C. restorer which helps to ensure a uniform pulse level. Without this the pulse level would tend to fluctuate as more or fewer pulses were present according to the number of calls in progress. The diode conducts between pulses, discharging C7 and ensuring a constant voltage at the grid of V27 whether more or fewer pulses of the cycle are present.

Pulses from the cathode of V27 are applied to terminal A, corresponding to terminal A on Fig. 14.

Pulses on a caller's or a responding callee's time positions are conveyed through coupling circuit 27, modulated in conformity with designation signals or microphone signals, which vary the dynode-to-common anode bias as already explained.

It will be clear of course, that a responding callee biasses his dynode when he responds to a call, by lifting his handset.

Turning now to Fig. 22, terminal 28 is connected in common to the anodes of V25 in block 39, of all selection circuits (see Fig. 19), and pulses arrive at this terminal at the time positions of all callers and callees between whom a connection has been set up.

These pulses are applied to the cathode of the outgoing distributor which is connected to the E. H. T. supply potentiometer 18, through a resistance R40. R40 is bridged by a rectifier 29 forming a D. C. restoring circuit, the rectifier conducting between pulses and discharging feed condenser C8 thus ensuring a uniform level of cathode potential between pulses irrespective of the number of pulses present in the cycle, as more or fewer calls are in progress. The effect of pulses from terminal 28 is to alter the potential between grid and cathode, which varies the intensity of the cathode ray in conformity with variations in the amplitude of the pulses from 28 at caller's and callee's time positions, both pulses being modulated with the simultaneous intelligence generated by caller and callee. Condenser C9, connected between the tapping points of grid and cathode, on potentiometer 18, keeps pulses from reaching the other electrodes of the tube.

The outgoing distributor deflector plates are connected to the same deflection circuit as in the case of the incoming distributor, so that the cathode rays of both, sweep corresponding dynodes simultaneously.

Pulses on caller's and callee's time positions, therefore, occur when the cathode ray of the outgoing distributor is scanning the dynodes associated with caller and callee and each of these dynodes emits a pulse similarly modulated which is passed to the subscriber connected to each of these dynodes, through an individual demodulator 25, only one of which is shown connected to dynode 16, in Fig. 22.

The dynodes of the outgoing distributor are connected through individual resistances to a source of —9 volts bias and earth, the common anode being earthed through resistance R41 so that these dynodes are always biased and pulses always appear on them. Only when these pulses are modulated, however, does any intelligence reach the receivers of subscribers connected to the dynodes, due to the action of the demodulators 25.

Dynode pulses are applied to the anode of diode V29 in demodulator 25 which acts in much the same way as a detector in a radio receiver, separating out the modulation component from the dynode pulses.

The output of V29 is taken from its cathode load through a low pass filter consisting of series chokes L2 and L3, bridged by condensers C9 and C10 respectively, and parallel condensers C11, C12 and C13, the filter removing any remaining traces of the pulse component and the modulation component being amplified by a two stage amplifier consisting of triode V30 and triode V31, the output of the latter being taken from the secondary winding of a transformer T47 the primary winding of which forms the anode load of V31.

From the secondary of T4, audio frequency signals are passed to terminals and wires, S and U and thence to receiver 21 in the subset concerned.

This happens in the demodulator 25 connected to any dynode which the cathode ray falls upon when it is modulated.

One reason for having the dynodes of the outgoing distributor permanently biassed in relation to the common anode, which is earthed, instead of being biassed 4.5 v. negative like the incoming distributor, is that the resulting pulses are utilised to form the line timing pulses required in the selection circuits as to which reference may be made to Figures 17, 18 and 19. A connection is taken from the common anode of the outgoing distributor to line timing pulse shaper 30 in Figure 22. Pulses appear in this connection at all time positions in the scanning cycle irrespective of whether any call is in progress, though the pulses will be modulated in the case of a caller and callee when they are passing signals.

V31 in pulse shaper 30 is connected as a conventional amplifier in the anode circuit of which is a transformer T6 which phase inverts the amplified pulses and passes them to the control grid of V32 which is normally conducting but is driven well past cut-off by the pulses which are of negative polarity at this point. This removes any modulation on the pulses and cathode follower V33 passes line timing pulses to terminal 31 whence they are received in connection N in Figure 17.

The sync pulses are also derived from the outgoing distributor, one dynode being devoted entirely to the purpose. (The corresponding dynode of the incoming distributor is idle.)

Dynode 13 is illustrated in this role in Figure 22 and it is connected to sync pulse shaper 32 in that figure.

V34 in pulse shaper 32 is connected as a conventional amplifier delivering one negative pulse from its anode, in each scanning cycle. These pulses are applied to the control grid of V35, normally conducting but driven past cut off during the pulses. The pulses from V35 anode are thus clipped to a uniform amplitude and are passed by cathode follower V36, to terminal 33, which is connected to terminal 33 on Figure 17. Figure 21, on the right hand side, shows the distributor deflection circuit 34 driving the deflector plates of both distributor tubes synchronously.

V37 is a triode connected as a conventional crystal controlled oscillator employing two crystals 35 and 36, giving a saw tooth wave form, which is taken to the control grid of V38, a valve with a short grid base alternatively driven past cut off and past maximum anode current in alternate half cycles of the oscillator output, giving a square wave form at its anode.

The anode load of V38 consists of a circuit timed to the distributor scanning frequency. This circuit consists of inductance L4 and condenser C43 in parallel and it is shock excited by the square wave form at the anode, producing a sine wave output across a potentiometer R42, R43, in parallel with the tuned circuit from a tapping of which a connection is taken to a pair of phase displacement circuits. One of the phase displacement circuits consists of a series condenser C15 and resistance R44, the latter bridged by a potentiometer R45 from the tapping of which the output is taken. The other phase displacement circuit consists of a series resistance R46 and condenser C16, the latter being bridged by a potentiometer R47 from the tapping of which the output is taken.

Of these phase displacement circuits, one advances the phases of the sine wave by 45° and the other retards it by 45°, so that the outputs of the two have a phase difference of 90°.

These outputs are applied to a pair of push-pull amplifiers shown as paraphase connected double triodes V39 and V40 in Figure 21, the out of phase outputs from the anodes of V39 are taken to the "X" deflector plates of the two distributors and the outputs from the anodes of V40 to the "Y" plates.

No hard and fast rule can be laid down for distributor scanning speeds, since it depends upon the type of intelligence requiring to be conveyed. For "commercial speech," however, for which the embodiment described was primarily intended, it is considered that at least 8,000 pulses per second are needed to convey adequate speech quality and it is preferred to use 10,000 pulses per second. This, of course, involves a distributor scanning frequency of 10 kcs., and the oscillator in deflection circuit 34 should be tuned to this frequency.

The 25 channel system, the pulses of which are shown on line b of Figure 4, involves a pulse repetition frequency of 250 kc./s. The line timing pulses derived from the common anode of the outgoing distributor should have this repetition frequency and the distributors should have 25 dynodes, one of which is devoted to production of the 10 kc./s. repetition frequency sync pulse leaving 24 working channels.

It is possible to use the sync pulse dynode to give a 25th channel, since the outgoing distributor is always emitting pulses, but precautions must be taken to ensure that the energy taken from this pulse for provision of the sync pulse does not impair the transmission of intelligence from this channel. Demodulator 25 of this channel may require special adjustment to ensure this.

Provision is made in sync pulse shaper 32 to strip any modulation from the pulses received from the dynode devoted to this purpose.

In Figure 21, the battery connected to terminal Q, which represents any convenient voltage source, would probably not be adequate for long lines between the distributors' and the subscribers' installations and it is preferable to supply a higher voltage, adjusted by a rheostat in each line, preferably at the central office, so that 9 volts is applied to all dynodes of the incoming distributor, when a call is commenced, irrespective of the length of the line.

The other embodiment referred to, to which Figures 26 and 27 relate, is similar in its basic principles to the embodiment above described and Figures 1 and 27 have many points in common.

The principal difference between the two embodiments resides in the use in the latter one, of a special type of cold cathode gaseous discharge tube as a time measuring device in the linefinder, in place of the delay circuits described in relation to blocks 11 and 12 of Figures 10, 12 and 15.

The basic difference between the two types of time measurement is that the circuits of blocks 11 and 12 aforesaid measure a period of time by virtue of the time constants of the circuits employed whereas the gaseous discharge tube of Figure 26 counts pulses and gives an output at a given phase in relation to those pulses.

The principal difference between Figures 1 and 27, therefore, is the use in the latter of a source of pulses, synchronous with the time positions allotted to the various subscribers to the system and, whilst these pulses could be furnished by ensuring that pulses were always present in the common member of the distributor, whether a call was being made or not, signalling conditions taking effect in the form of modulations of the pulses, it is easier, in an arrangement of the type described, to use the line timing pulses which are already provided for the purposes of the selector circuits.

Another important difference between Figures 1 and 27 is the expedient used in the latter of applying suppression and gate pulses so as to cut off the pulses from the common member of the distributor instead of blocking the search pulses. This feature could, however, be applied to the embodiment first described and the opportunity is taken of introducing this variant into Figure 27 by way of illustration.

Since the gaseous discharge tube will tend to continue measuring off the time period, even when pulses from the caller have ceased, since its driving force comes from the line timing pulses, positive means must be introduced of stopping it when the caller's pulses cease. A device marked "clear down," 55', in Figure 27 caters for this.

In Figure 26 a gaseous discharge tube 34 has an anode 35 and cathodes 36 and 37. Cathode 36 has a number of members projecting towards the anode 35 to form a number of discharge gaps, and cathode 37 forms, with anode 35, a single discharge gap. All these discharge gaps, hereinafter called "sequence gaps," are substantially equally spaced from one another and the gap distances are all substantially equal.

Anode 35 is connected, through an impedance R48, to the positive terminal of a source of potential, cathodes 36 and 37 being connected to the negative terminal of this source, through impedances R49 and R50 respectively. A further anode 38 co-operates with a further cathode 39, to form an additional discharge gap, hereinafter called the priming gap, and this is situated near to one of ten gaps between 35 and 36, preferably the one at the end of 36 remote from 37. Electrodes 38 and 37 are connected respectively to the positive and negative terminals of the said source of potential, through impedance R51 in the case of 38 and R50 in the case of 37.

The potential applied to the various electrodes from the said source of potential (which is preferably steady potential such as would be obtained from a battery) is adjusted so that it is incapable of initiating a discharge across any gap in the tube, but is sufficient to maintain a discharge once initiated.

Tubes of this type are described in detail in application Serial No. 763,655, filed July 25, 1947, their general principle of operation being as follows:

Pulses are applied to the sequence gaps of an amplitude sufficient to fire any gap which is ionised by the spread of ionisation from an adjacent previously fired gap. There are various ways of making one of the gaps fire when the pulses are initially applied to an inert tube, an independent priming gap such as that between 38 and 39, fixed independently, being one way.

When the priming gap is discharging, it ionises the adjacent sequence gap, the energy level in the priming gap and geometry of the tube generally, being preferably arranged so that the ionisation does not spread to a second sequence gap.

A first pulse applied to the sequence gaps will now fire the one ionised by the priming gap, and after the pulse this discharge will be maintained by the steady potential. A second pulse will fire the next sequence gaps due to its being ionised by the discharge in the first sequence gap, and successive pulses will fire successive sequence gaps till all have fired. It is arranged then that the discharge in the last sequence gap which is separately connected to an external circuit (represented by R50 in Figure 26) produces a potential which opposes the steady potential applied to the sequence gaps and reduces it to a value at which the discharges cannot be maintained, and they are extinguished.

There are many ways of producing the extinguishing potential, some of which are described in application, Serial No. 763,655, and in application, Serial No. 777,815, filed October 3, 1947.

The extinguishing potential may be removed before the onset of the next pulse or may be continued during one or more succeeding pulses, as described in application Serial No. 777,815, though in such case the number of sequence gaps required to respond to a pulse cycle of a given number of pulses, must be reduced by the number of pulses during which the extinguishing potential is continued, as is explained in that specification.

The tube of Figure 26 is normally inert in all its gaps.

When a coincidence occurs between a search pulse and a calling pulse from the distributor common member, this coincidence is caused to apply a pulse to the priming gap 38, 39, and is shown as a negative pulse 40, applied to cathode 39; though it could equally well be in a positive pulse applied to anode 38.

This pulse fires the priming gap, causing ionisation of the adjacent sequence gap. The pulses applied to the sequence gap are the line timing pulses 42, as previously explained, and the pulse next after the coinciding pulse fires the first sequence gap, succeeding pulses firing the sequence gaps in succession till all have fired.

On the firing of the last gap, 37—35, a pulse is taken from 37, due to the voltage across R50, and this is used as or to generate the gate pulse, shown as a positive pulse 41 in Figure 26.

The tube is then extinguished by the same pulse or by a potential derived therefrom in a device for the purpose shown as a rectangle ED. A self restoring Eccles Jordan circuit of conventional type could be used for the purpose, the extinguishing potential being taken from a tube normally non-conducting but "flipped" to conduction by the gate pulse for the period required for extinguishment.

The next line timing pulse will again fire the first sequence gap, ionised by the priming gap which continues to discharge from the steady potential, once fired by the coincidence of search pulse and calling pulse. The tube 34 has ten sequence gaps which would be suitable for a system having ten time positions in its distributor cycle.

As the priming gap constitutes an eleventh gap when the tube is first started, the gate pulse will occur at the same time position as the pulse which fired the priming gap. In future cycles, the priming gap does not form an eleventh gap, and consequently these are only ten discharges per operating cycle of the tube and the gate pulse, therefore, occurs at the same time position.

Tube 34 acts as a pulse counter. It continues to count until it is positively stopped. This necessitates measures for the purpose which are explained later in relation to Figure 27, and which produce a pulse 43 shown as a negative pulse applied to anode 38 of the priming gap, though positive pulses could equally well be applied to the cathode 39.

Pulse 43 extinguishes the priming gap and removes ionisation from the first sequence gap which is unable to fire when the next line timing pulse occurs, after extinguishment.

Figure 27 shows the modifications necessary to fit the tube of Figure 26 into a system according to the invention.

Search pulses from search pulse unit 44 are applied to the first of several line finders, two of which are shown (as in Figure 1).

A search pulse shaper 45 shapes the pulse as in Figure 1 and a phase shift device passes a phase shifted search pulse to 45' in the second line finder. Phase shift device 46' passes a search pulse, further phase shifted, to the next line finder (not shown) and so on throughout the line finders. A mixer and delay trigger 47 receives search pulses and pulses from the distributor common from connection 48. A coincidence between a search pulse and a calling pulse from 48 causes an output from 47 which is applied to the priming gap of the tube shown in Figure 26, which is contained in delay circuit 49.

Gate pulses 41, from the last sequence gap of tube 34, are passed to a delay gate 50, normally closed but opened during the gate pulse to pass pulses from 48, to output 51. These pulses being at the time position of the caller.

Gate pulses are also passed to connection 52 which is connected in common to the same position in all line finders and are taken to suppression gates 53, normally open but closed by the gate pulses.

Gate 53 is in the path of pulses from 48 and cuts them off at the time position of a caller appropriated by a line finder so that they cannot affect other line finders.

Gate 53, however, only cuts the access of the distributor pulses from mixer and delay trigger 47, 47', etc. in the line finders, the pulses being passed to the delay gates 50, by a connection 54, not passing through gate 53.

The callers pulses, which maintain a minimum amplitude during a call, are passed to the clear down circuit 55. The first pulse passed by 50 changes 55 to an off normal condition which causes a pulse of opposite polarity to pulse 43, and this may be passed to anode 38 of tube 34 with impunity as it adds momentarily to the discharge potential of the priming gap and as this gap is now discharging, the pulse is ineffective. It may however, be eliminated by a rectifier in the output of 55 and this may be desirable if when there is a risk of a momentary increase of starting gap current might cause the ionisation to spread to a second sequence gap. This may happen in the case of a tube designed to work within fine limits.

When the caller's pulses cease (or are reduced in amplitude to a quiescent value, in cases where the distributor is biassed to produce some pulses in the quiescent or "no-call" condition), the clear down device 55 reverts to its normal condition applying pulse 43 to the priming gap of tube 34 and extinguishes the discharge in that gap.

A conventional electronic flip flop circuit of the Eccles Jordan type could be used in the role of 55. The circuit would be of the type which could be "flipped" on receipt of a pulse and kept in that state by repeated pulses thereafter, but arranged to revert to its normal state on cessation of the pulses (or reduction thereof as aforesaid).

A square pulse can be obtained from such an arrangement, commencing when the circuit "flips" and ending when it "flops." For instance, if two thermionic valves were used, this pulse could be taken from the anode circuit of one of the tubes. This square pulse may then be differentiated to provide a pulse of one polarity on its leading edge and of opposite polarity on its trailing edge. The former may be removed by a rectifier as previously explained. Apart from delay circuit 49 and clear down 55, the other circuits of Figure 27 may be similar to some of these used in the embodiment first described.

For instance, search pulse unit 44, could be similar to blocks 1, 2 and 3 in Figures 10 and 14. Search pulse shaper 45 and phase shift 46 could be similar to block 4 of Figures 10 and 15. Mixer and delay trigger 47 could be similar to block 8 of Figures 10 and 15, block 9 being added if required. Delay gate 50 could be similar to block 15 of Figures 10 and 16.

If difficulty is experienced in obtaining a pulse of the correct type for the gate pulse, by direct connection from cathode 37, it may be necessary to insert a pulse producer similar to block 13 of Figures 10 and 15, fed from cathode 37 and giving an output pulse of the type required. The positive pulses from cathode 37 would need to be phase reversed before application to a circuit like block 13.

In using the arrangement of Figure 37 in a system such as that described in the case of the first embodiment, it is necessary to keep pulses from an answering callee from operating any line finder. This could be arranged by applying suppression pulses, such as those from block 32, Figures 11 and 19, along connections 56, 56' etc. to 53 to cut off pulses at this time position from mixers and delay triggers 47, 47' etc. in the line-finders.

Suppression gate 53 could thus consist of a suppression pulse mixer similar to block 14 in Figures 10 and 16 and a gate similar to block 5 in Figures 10 and 15.

Reverting to Figure 26, the priming gap need not necessarily have both electrodes separate from these of the sequence gaps. For instance, anode 38 could be an extension of common anode 35, though the clear down pulses would then have to consist of positive pulses applied to 39. Alternatively, the cathodes of the first sequence gap could do additional duty as the cathode of the priming gap, a separate priming gap anode being in the position of cathode 39. In this case the coincidence pulses would have to be positive pulses applied to this anode.

What is claimed is:

1. A switching system comprising a plurality of input circuits, means for allotting to such input circuits individual time positions in a recurring cycle of time positions, means for producing a pulse in response to a signal applied to an input circuit, said pulse being characteristic of said signal and being produced at the time position allotted to such input circuit, means for generating search pulses at a frequency different from the recurrence frequency of said cycle, a plurality of segregating means connected to said input circuits, and means for applying the search pulses to said segregating means, each segregating means including means for comparing the timing pulses produced as aforesaid with the said search pulse and, on the coincidence in the segregating means of a pulse produced as aforesaid with a search pulse, to segregate further pulses at the same time position as the coincident pulse from pulses at other time positions and from said search pulses, and means for ensuring that such a coincidence cannot be effective in any two or more of the segregating means simultaneously in respect of the same pulse.

2. A system as claimed in claim 1, in which the means last mentioned in that claim consist of means for altering the phase of the search pulse so that it is received at a different phase by each segregating means and so that no search pulse can be effective in two or more of the segregating means simultaneously.

3. A system as claimed in claim 1 in which the allotting means comprises an electronic distributor.

4. A system, as claimed in claim 1, in which the segregating means includes means for causing the suppression of the search pulse after an initial coincidence has taken place, said last-mentioned means comprising means for responding to an initial coincidence between a search pulse and a signal pulse, means for producing a gate pulse at a time displaced from the time of the initial coincidence an interval equal to the time displacement between signal pulses from the same input circuit, means for utilizing said gate pulse for suppressing the search pulse, and means for replacing the suppressed pulse with the gate pulse.

5. A system as claimed in claim 4 in which the means for producing the gate pulse is a time measuring device including means for measuring a time interval substantially equal to the interval between two successive pulses at a given time position, means for starting said device at the said coincidence, and means for reverting said device on the expiration of the said time interval to a condition from which it may be restarted.

6. A system, as claimed in claim 5, further comprising means for generating a pulse at each time position of the cycle, the means for producing a gate pulse being connected to said pulse generating means and including means for counting the pulses during the time to be measured and for giving an output after counting the number of pulses equal to the number of time positions in said cycle.

7. A communication switching system comprising a plurality of input circuits, a distributor having elements to each of which an input circuit is connected and a common member from which an output is taken, means for operating said distributor whereby the output thereof consists of pulses at individual time positions in a cycle of time positions corresponding to a cycle of the said distributor, each time position being characteristic of one of the input circuits, means for altering a characteristic of said pulses in response to signals applied to the respective input circuits, a plurality of devices connected to said distributor for segregating pulses at the time position which is characteristic of an input circuit to which a calling signal is applied from pulses at other time positions, a generator of search pulses connected with the segregating devices in cascade, means in the segregating devices for altering the phase at which the search pulse is received by each segregating device, so that no two segregating devices receive search pulses at the same phase, a first gate in each segregating device, means in each segregating device for delivering search pulses received by said device to said first gate, a mixing device in each segregating device, means for applying pulses from said distributor to said mixing device, means for applying search pulses to said mixing device after they have passed through said gate, whereby said pulses from said distributor are mixed with search pulses from said first gate when said gate is open, said mixing device being adapted to give an output when a pulse from said distributor coincides with a search pulse from said first gate, a second gate in each segregating device connected to said mixing device, means for delivering gate pulses to said second gate, said second gate being responsive to a pulse from said mixing device caused by a first coincidence in said mixing device of a search pulse with an altered pulse produced by said altering means in response to a calling signal applied to an input circuit, and also responsive to a pulse from said mixing device caused at future recurrences of the time position at which such coincidence occurred, whereby said second gate will give an output only on the coincidence of the pulse produced as aforesaid with a gate pulse, a delay device in each segregating device comprising trigger means connected to the second gate and responsive to the output thereof to cause said delay device to measure a period of time substantially equal to the interval between successive pulses on a given time position, said trigger means being adapted to recover to a condition from which it can be retriggered by the next pulse at the time position of the pulse by which it was initially triggered, said delay device being adapted to give two outputs at the end of such period, one being a suppression pulse and the other being the said gate pulse and both timed so as to include the time position of the pulse which initially triggered said delay device but no other time position, said mixing device being also adapted to give an output when a pulse from said distributor corresponds with a gate pulse, means for applying said suppression pulses to all the other segregating devices, and a third gate in each segregating device connected to receive pulses from said distributor and gate pulses, and means for operating said third gate to permit the passage of the former pulses when they coincide with the latter pulses.

8. A system, as claimed in claim 7, in which the delay device comprises a time-measuring device having an input circuit connected to the distributor and to the mixing device and an output circuit, and including a pulse counting device and means responsive to a pulse from said mixing device for operating said pulse counting device to count pulses from said distributor and thus produce a gate pulse in said output circuit at each recurrence of the time position subsequent to that at which it was started, and in which a device is provided connected to the second gate comprising means responsive to a pulse from said distributor admitted by said second gate and varied in a predetermined manner for producing an output pulse, said time-measuring device also comprising means for stopping the counting action, and means connecting the output of said last-mentioned device to said stopping means, whereby an output pulse of the former stops the counting of the latter to restore the segregating means to normal.

9. A system, as claimed in claim 8, in which the time-measuring device comprises a cold cathode gaseous discharge tube having a number of gaps arranged in proximity in such a manner that a discharge across one gap will ionize the gas in the next adjacent gap, so as to prepare it for discharge when a difference of potential is applied across the electrodes thereof, ionizing means responsive to the receipt of a pulse for ionizing the gas in the first gap and maintaining it ionized, means for repeatedly applying a series of pulses to said gaps in common whereby the gaps will fire in succession, means connected to the last gap and responsive to a pulse produced when said last gap is fired for applying a pulse to said gaps in common having such amplitude and polarity as to extinguish all said gaps, means for delivering a pulse from the mixing device to said ionizing means for causing said means to ionize the gas in the first gap, so as to cause the successive firing of said gaps to be repeated, one gap being fired for each pulse to be received by said gap, means for delivering a pulse to the ionizing means of such polarity and amplitude as to render it ineffective and thus stop the repetition of the successive firing of said gaps, and means connected to a predetermined gap for delivering an output pulse when said predetermined gap is fired.

10. A system as claimed in claim 9 in which the gaps of the discharge tube adapted to fire in succession include a group connected in common and equal in number to the number of time positions in the cycle and an additional gap adjacent one of the sequence gaps, the additional gap being connected to the mixing device, and in which the means for extinguishing all the gaps operates when said additional gap fires.

11. A switching system comprising a plurality of input circuits, means for allotting individual time positions to said input circuits in a recurring cycle of time positions, means operative when a signal appears on an input circuit for generating a signal pulse at the time position of said input circuit, means for generating search pulses at a frequency slightly different from the frequency of the said cycle of time positions, a plurality of segregating circuits, means for feeding both the search pulse and the signal pulse to each of said segregating circuits, coincidence means in each segregating circuit responsive to the coincidence of two received pulses for generating a gate pulse after the coincidence at a time interval thereafter equal to the time of one cycle of said time positions, and means for substituting said gate pulse for said search pulse in said segregating circuit at the next cycle after the coincidence of said search pulse and said signal pulse.

DAVID HIRAM RANSOM.
WILLIAM LESLIE ROBERTS.
RONALD HAROLD TAPLIN.

References Cited in the file of this patent
UNITED STATES PATENTS

| Number | Name | Date |
|---|---|---|
| 1,905,359 | Affel | Apr. 25, 1933 |
| 2,199,634 | Koch | May 7, 1940 |
| 2,271,000 | Lovel | June 27, 1942 |
| 2,277,192 | Wilson | Mar. 24, 1942 |
| 2,387,018 | Hartley | Oct. 16, 1945 |
| 2,388,001 | Loughren | Oct. 30, 1945 |
| 2,418,116 | Grieg | Apr. 1, 1947 |
| 2,454,815 | Levy | Nov. 30, 1948 |
| 2,462,896 | Ransom | Mar. 1, 1949 |
| 2,492,136 | Deloraine et al. | Dec. 27, 1949 |
| 2,492,180 | Ransom | Dec. 27, 1949 |